US011083286B2

(12) United States Patent
Seyfried et al.

(10) Patent No.: US 11,083,286 B2
(45) Date of Patent: Aug. 10, 2021

(54) STAND AND SYSTEM FOR ASSISTING VISUAL PERCEPTION

(71) Applicant: Association for the Blind and Visually Impaired, Rochester, NY (US)

(72) Inventors: Joseph A. Seyfried, Webster, NY (US); Francis K. Tse, Bayside, NY (US); Stan Rickel, Scottsville, NY (US); James W. Wilson, Walworth, NY (US); Michael K. Baskin, Naples, NY (US); Joseph R. Kells, Victor, NY (US)

(73) Assignee: Association for the Blind and Visually Impaired, Rochester, NY (US)

( * ) Notice: Subject to any disclaimer, the term of this patent is extended or adjusted under 35 U.S.C. 154(b) by 186 days.

(21) Appl. No.: 16/274,323

(22) Filed: Feb. 13, 2019

(65) Prior Publication Data
US 2020/0253373 A1   Aug. 13, 2020

(51) Int. Cl.
*A47B 23/04* (2006.01)
*F16B 1/00* (2006.01)
*F16M 11/10* (2006.01)
*F16M 11/04* (2006.01)

(52) U.S. Cl.
CPC .............. *A47B 23/043* (2013.01); *F16B 1/00* (2013.01); *F16M 11/046* (2013.01); *F16M 11/10* (2013.01); *F16B 2001/0035* (2013.01); *F16M 2200/021* (2013.01); *F16M 2200/025* (2013.01); *F16M 2200/06* (2013.01)

(58) Field of Classification Search
CPC ......... F16B 1/00; F16M 11/046; F16M 11/10; F16M 2200/021; F16M 2200/025; F16M 2200/06; A47B 23/043
See application file for complete search history.

(56) References Cited

U.S. PATENT DOCUMENTS

| 2,876,359 | A | * | 3/1959 | Plymale | G03B 42/025 |
| | | | | | 378/181 |
| 5,385,327 | A | | 1/1995 | Hegarty et al. | |
| 5,615,854 | A | | 4/1997 | Nomura et al. | |
| 5,732,912 | A | | 3/1998 | Nomura et al. | |
| 5,993,077 | A | | 11/1999 | Jones | |
| 6,042,080 | A | * | 3/2000 | Shepherd | B60R 11/00 |
| | | | | | 248/163.1 |
| 6,203,396 | B1 | * | 3/2001 | Asmussen | A47F 8/00 |
| | | | | | 446/268 |
| 6,212,800 | B1 | * | 4/2001 | Bagley | D05C 1/02 |
| | | | | | 38/102.1 |

(Continued)

OTHER PUBLICATIONS

Dewey Document Camera Stand, website. "https://www.discountschoolsupply.com/Product/ProductDetail.aspx?domainredirect=true&product=33537&xes=237310000ESC&msclkid=6ddd4684c585123fd1d31a8f21f6aecautm_source=bing&utm_medium=cpc&utm_campaign=*Shopping:%20Science%20-%20JF&utm_term=4581939832452035&utm_content=Technology" Dec. 8, 2018.

(Continued)

*Primary Examiner* — Christopher Garft
(74) *Attorney, Agent, or Firm* — Michael J. Nickerson; Basch & Nickerson LLP

(57) ABSTRACT

A visual assistive stand includes a base; a vertical arm; and a horizontal attachment arm. The base has a configured receptacle for attaching the vertical arm. The vertical arm and the base have a detachable magnetic attachment. The horizontal attachment arm includes magnets.

15 Claims, 20 Drawing Sheets

(56) References Cited

U.S. PATENT DOCUMENTS

| | | | | |
|---|---|---|---|---|
| 6,334,594 B1* | 1/2002 | Bailey | | F16M 11/24 248/125.1 |
| 6,540,415 B1 | 4/2003 | Slatter et al. | | |
| 6,682,029 B1* | 1/2004 | Dierkes | | F16M 11/14 248/158 |
| 6,957,794 B2* | 10/2005 | Landreville | | F16M 11/2085 248/123.2 |
| 7,077,366 B2 | 7/2006 | Young | | |
| 7,163,181 B2* | 1/2007 | Omps | | F16C 11/0619 248/181.1 |
| 7,178,765 B2* | 2/2007 | Huang | | A47B 21/00 248/122.1 |
| 7,621,492 B2* | 11/2009 | Omps | | F16C 11/0619 248/181.1 |
| 7,703,737 B2* | 4/2010 | Petrick | | F16M 11/16 248/407 |
| 7,712,719 B2* | 5/2010 | Derry | | F16M 11/38 248/346.06 |
| D623,681 S | 7/2010 | Fong | | |
| 7,789,356 B1 | 9/2010 | Jones | | |
| 8,225,726 B1* | 7/2012 | Fineberg | | A47B 13/023 108/158.12 |
| 8,573,548 B2* | 11/2013 | Kuhn | | A47F 5/0815 248/220.31 |
| 8,584,995 B2 | 11/2013 | Russell | | |
| 8,730,387 B2 | 5/2014 | Cordes | | |
| 8,888,056 B2* | 11/2014 | Lu | | F16M 11/24 248/123.11 |
| 8,980,623 B2 | 2/2015 | Woolford | | |
| 9,146,584 B2 | 9/2015 | Bowles | | |
| 9,195,119 B2 | 11/2015 | Wendt | | |
| 9,237,802 B1* | 1/2016 | Kral | | G06F 1/1632 |
| 9,282,225 B2 | 3/2016 | Chen | | |
| 9,323,134 B2 | 4/2016 | Clark | | |
| 9,423,672 B1 | 8/2016 | Kilgore et al. | | |
| 9,631,767 B2 | 4/2017 | Kilgore et al. | | |
| 9,772,083 B2 | 9/2017 | Kilgore et al. | | |
| D802,647 S | 11/2017 | Duffy et al. | | |
| 9,830,831 B2 | 11/2017 | Shen | | |
| D812,124 S | 3/2018 | Duffy et al. | | |
| 10,036,936 B2 | 7/2018 | Kittanoh et al. | | |
| 2007/0029715 A1* | 2/2007 | Liu | | B23D 55/023 269/139 |
| 2013/0048804 A1* | 2/2013 | Furuta | | G10G 5/00 248/168 |
| 2013/0314593 A1 | 11/2013 | Reznik et al. | | |
| 2017/0069228 A1 | 3/2017 | Reznik et al. | | |
| 2020/0062532 A1* | 2/2020 | Rodriguez | | B65H 49/321 |

OTHER PUBLICATIONS

Mobile Stands, website: "https://www.pinterest.com/pin/269160515203834413/" Dec. 8, 2018.

Black Studio Camera Stand, website: "https://aj-s.co.uk/product/2345/cambo-mbx-1-black-studio-camera-stand-column-7-2-1m-99131701.html" Dec. 8, 2018.

Kaiser Copylizer, website: "https://www.bhphotovideo.com/c/product/904748-REG/kaiser_205232_copylizer_evision_exe_cutive_camera.html" Dec. 8, 2018.

PVC Camera Mount, website: "https://thecraftyblogstalker.com/diy-overhead-camera-mount/2/" Dec. 8, 2018.

\* cited by examiner

STAND AND SYSTEM FOR ASSISTING VISUAL PERCEPTION

BACKGROUND

According to some estimates, nearly 2.9 million Americans are visually impaired. Many more have trouble reading due to other conditions, such as stroke or traumatic brain injury. The prevalence of vision impairment increases rapidly in the later years, particularly after age 75. Even people with the least degree of vision impairment may still face challenges in everyday life as typical everyday activities such as reading a newspaper become difficult if not impossible.

There are a number of vision assistance devices on the market to assist those whose ability to read is impaired by visual difficulties.

An example of a conventional vision assistance device is disclosed in Published US Patent Application Number 2017/0069228. The entire content of Published US Patent Application Number 2017/0069228 is hereby incorporated by reference.

As disclosed in Published US Patent Application Number 2017/0069228, a vision assistive device includes a free-standing housing having an inner volume for accommodating therein electrical components for carrying out functionalities of the vision assistive device. The housing is designed to enable the vision assistive device to stand unsupported or unassisted on a surface in operation. The housing may be foldable or telescopic to facilitate carrying the vision assistive device.

However, many conventional vision assistance devices are self-contained requiring the visually impaired user to purchase unnecessary functionality, thereby increasing the cost for a vision assistance device.

For example, Published US Patent Application Number 2017/0069228 discloses a vision assistive device that includes self-contained imaging devices. By including the imaging devices in the vision assistive device, the unit cost of the vision assistive device is increased and prevents the visually impaired user from using a distinct image device, such as a smart phone or a digital tablet.

In addition, Published US Patent Application Number 2017/0069228 discloses a vision assistive device that includes a self-contained display device. By including the display device in the vision assistive device, the unit cost of the vision assistive device is increased and prevents the visually impaired user from using a distinct display device, such as a television, a personal computer, a laptop, etc.

Accordingly, it is desirable to provide a vision assistive device or system that is easy to set up and operate.

Moreover, it is desirable to provide a vision assistive device or system that is easy to set up and operate and can readily operate with a distinct image device, such as a smart phone or a digital tablet.

Furthermore, it is desirable to provide a vision assistive device or system that is easy to set up and operate and can readily operate with a distinct display device, such as a television, a personal computer, a laptop, etc.

In addition, it is desirable to provide a vision assistive device or system that is easy to set up and operate; can readily operate with a distinct image device, such as a smart phone or a digital tablet; and can readily operate with a distinct display device, such as a television, a personal computer, a laptop, etc.

BRIEF DESCRIPTION OF THE DRAWINGS

The drawings are only for purposes of illustrating various embodiments and are not to be construed as limiting, wherein.

DETAILED DESCRIPTION

Figure 1:
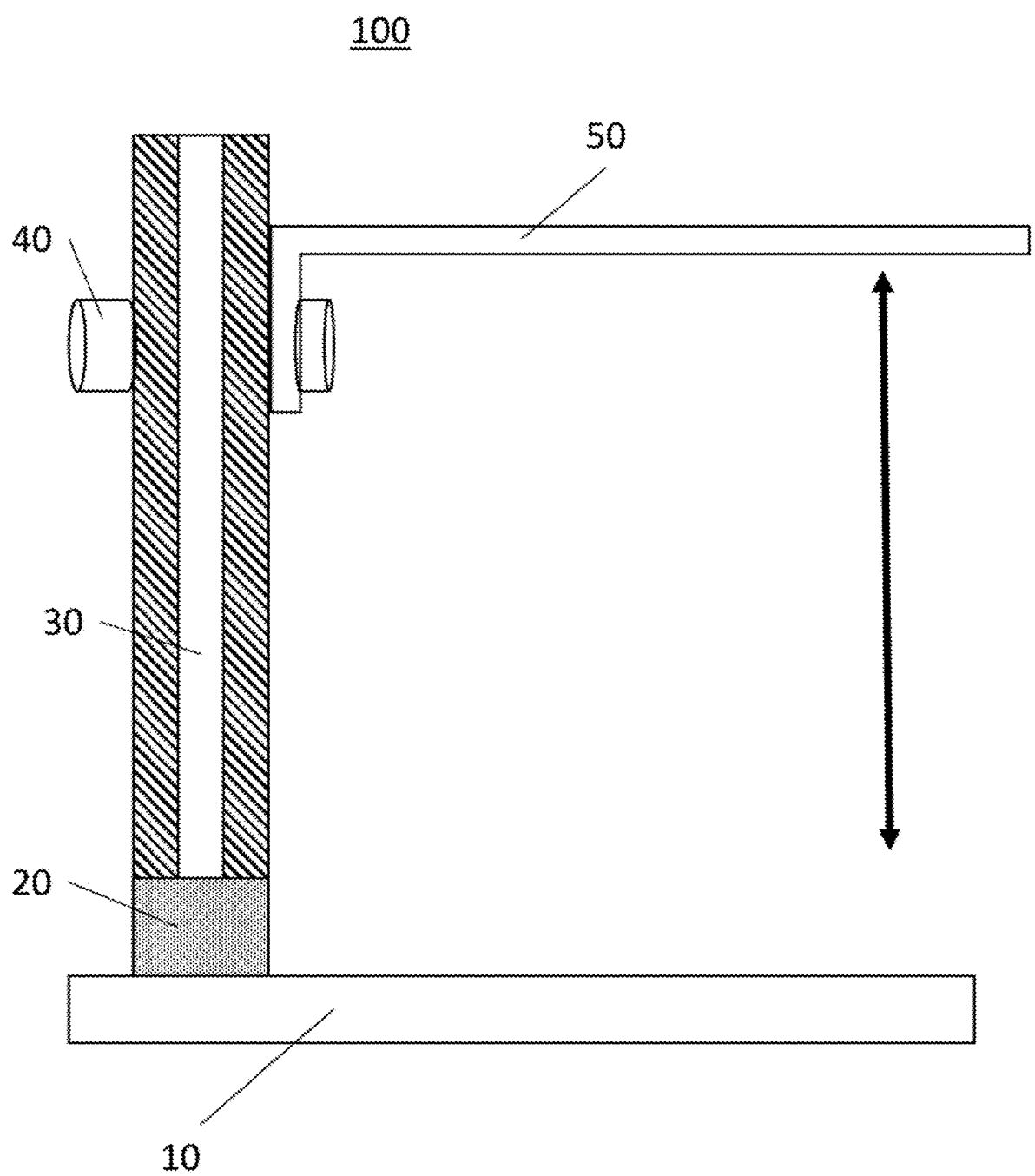
FIG. 1 shows a vision assistive stand for mounting an imaging device.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

FIG. 1 illustrates a visual aid stand 100 that includes a base 10. The base 10 has sufficient weight and/or footprint to prevent toppling when an imaging device (not shown), such as a smartphone a tablet, or other imaging device, is connected to a horizontal attachment arm 50.

The base 10 includes a configured receptacle member 20 (described in more detail below) for receiving a vertical arm 30 having a configuration corresponding to the configured receptacle member 20 to ensure proper attachment.

The vertical arm 30 includes a positioning mechanism (not shown) for enabling vertical positioning (arrow) of the horizontal attachment arm 50.

In one embodiment, the positioning mechanism is a vertical slot 31 for receiving horizontal attachment arm locking mechanism 40 so that the horizontal attachment arm 50 can be positioned in a vertical fashion along the vertical channel. More specifically, the vertical slot 31 receives horizontal attachment arm locking mechanism 40 so that the horizontal attachment arm 50 can be positioned in a continuous vertical fashion along the vertical channel 31.

As illustrated in FIG. 1, the horizontal attachment arm locking mechanism 40 is a bolt/nut locking mechanism that clamps the horizontal attachment arm 50 to the vertical arm 30 by squeezing the opposite sides of the bolt/nut locking mechanism against the vertical arm 30.

Figure 3:
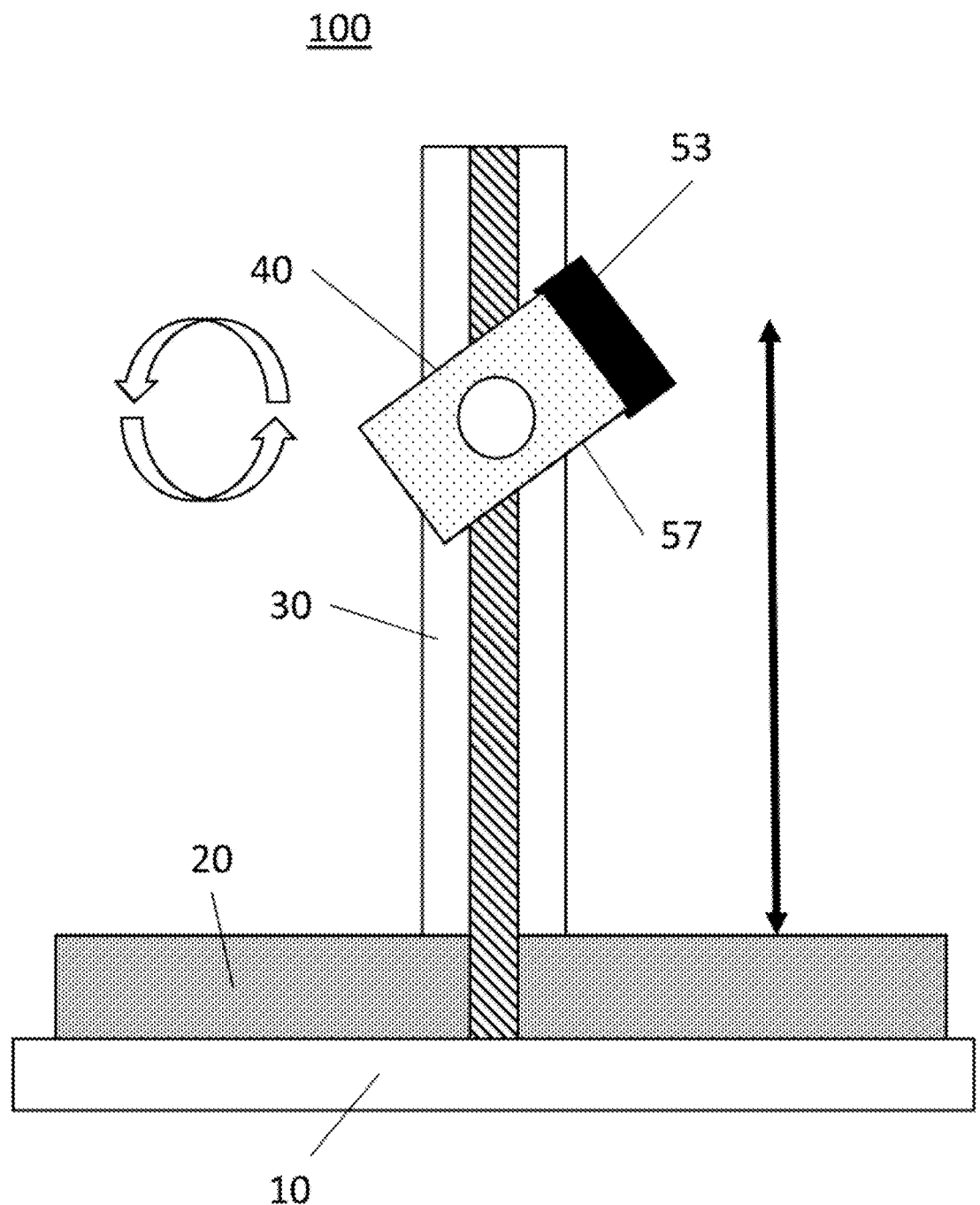
FIG. 3 shows a second configuration of the vision assistive stand of FIG. 1.
Figure 4:
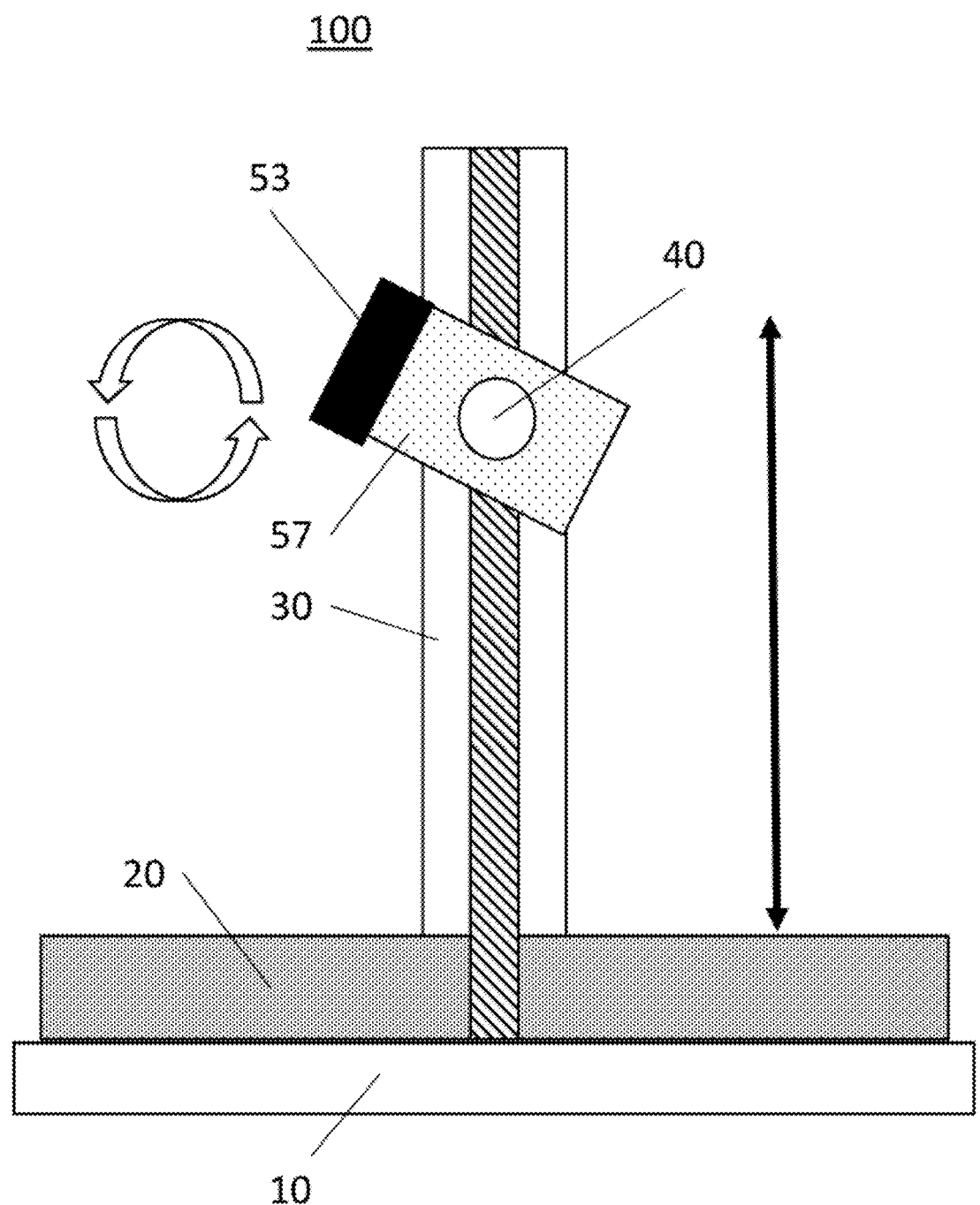
FIG. 4 shows a third configuration of the vision assistive stand of FIG. 1.

The horizontal attachment arm locking mechanism 40 may allow the horizontal attachment arm 50 to be rotated 360° around the axis of the horizontal attachment arm locking mechanism 40 (See FIGS. 3 and 4).

As illustrated in FIG. 1, the horizontal attachment arm is an L-shaped member having a vertical arm attachment leg (57 of FIG. 2) of the L-shaped horizontal attachment arm 50 engaging the vertical arm 30 and the horizontal attachment arm locking mechanism 40 and an imaging device support leg (53 of FIG. 2) of the L-shaped horizontal attachment arm 50 projecting in an orthogonal fashion away from the vertical arm 30.

It is noted that the horizontal attachment arm locking mechanism 40 may include a thumb wheel.

Figure 2:
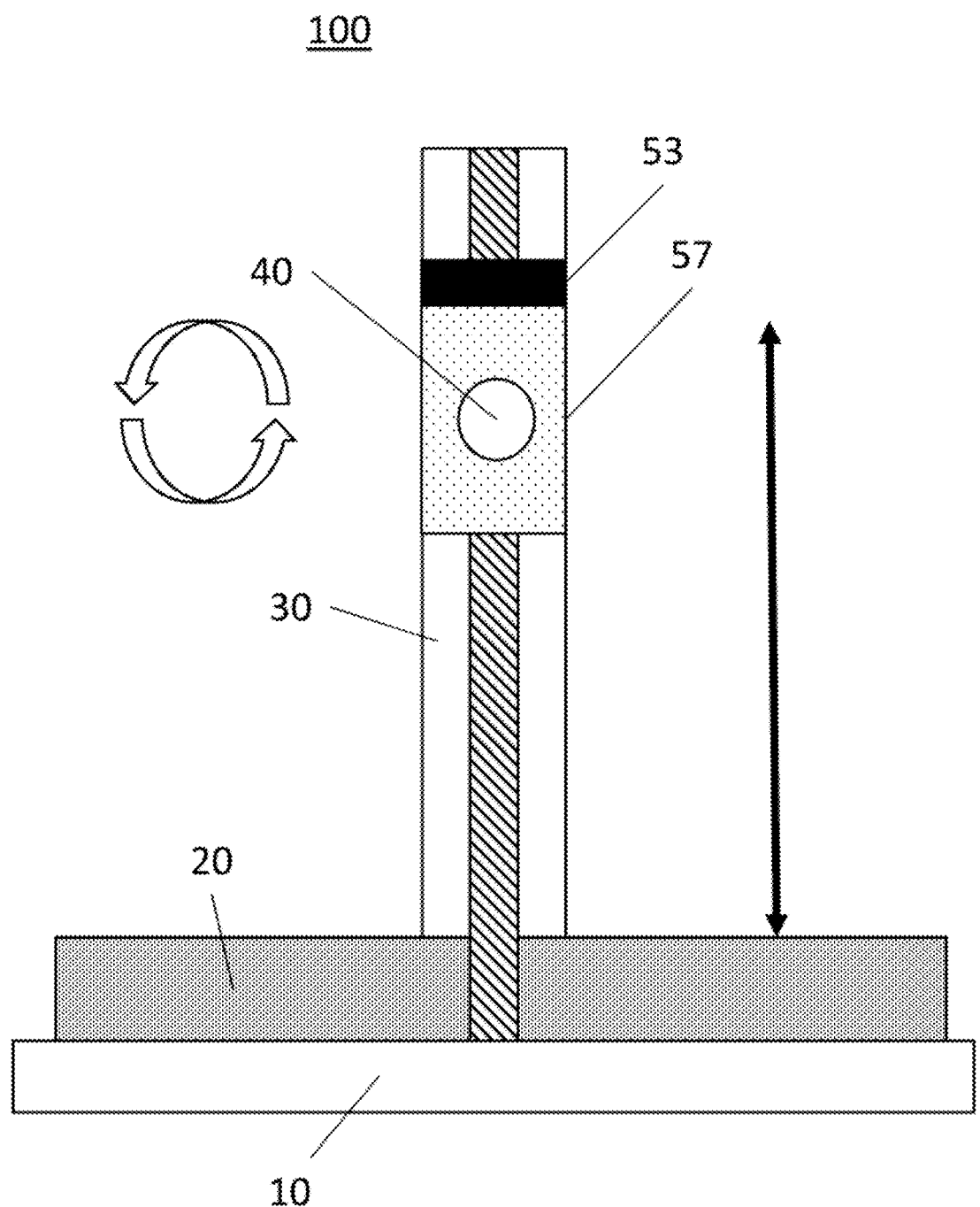
FIG. 2 shows a first configuration of the vision assistive stand of FIG. 1.

FIG. 2 shows a first configuration of the vision assistive stand of FIG. 1. As illustrated in FIG. 2, the imaging device support leg 53 of the L-shaped horizontal attachment arm 50 projects in an orthogonal fashion (out from the page) away from the vertical arm 30 and is parallel to the base 10. The horizontal attachment arm 50 may be positioned in a vertical direction as illustrated by the double-headed arrow and can be rotated as illustrated by the rotating arrows.

FIG. 3 shows a second configuration of the vision assistive stand of FIG. 1. As illustrated in FIG. 3, the imaging device support leg 53 of the L-shaped horizontal attachment arm 50 projects in an orthogonal fashion (out from the page) away from the vertical arm 30 and has been rotated clockwise so that the imaging device support leg 53 of the L-shaped horizontal attachment arm 50 is no longer parallel to the base 10. The horizontal attachment arm 50 may be positioned in a vertical direction as illustrated by the double-headed arrow and can be further rotated as illustrated by the rotating arrows.

FIG. 4 shows a third configuration of the vision assistive stand of FIG. 1. As illustrated in FIG. 4, the imaging device support leg 53 of the L-shaped horizontal attachment arm 50 projects in an orthogonal fashion (out from the page) away from the vertical arm 30 and has been rotated counter-clockwise so that the imaging device support leg 53 of the L-shaped horizontal attachment arm 50 is no longer parallel to the base 10.

The horizontal attachment arm 50 may be positioned in a vertical direction as illustrated by the double-headed arrow and can be further rotated as illustrated by the rotating arrows.

Figure 5:
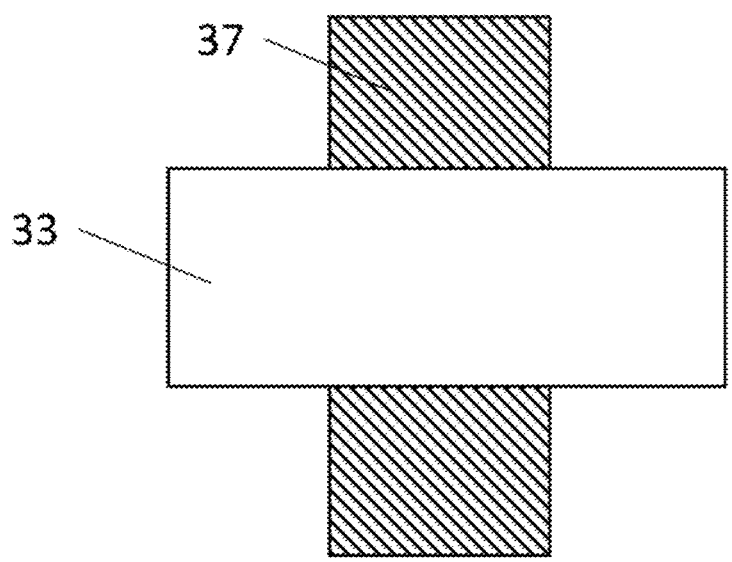
FIG. 5 illustrates a foot print of a vertical arm of the vision assistive stand of FIG. 1.

FIG. 5 illustrates a foot print of a vertical arm of the vision assistive stand of FIG. 1. As illustrated in FIG. 5, the vertical arm 30 includes orthogonal projections (33 and 37), which are configured to match the channels (21, 22, 24, and 26) of configured receptacle member 20, as illustrated in FIG. 6.

Figure 6:
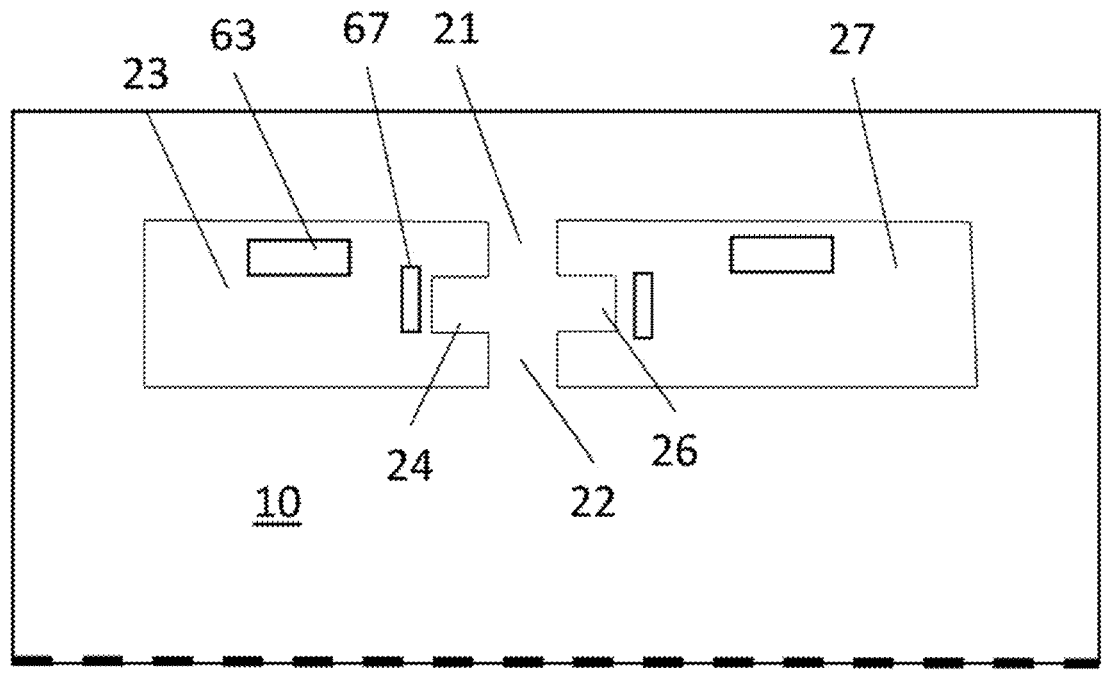
FIG. 6 shows a base of the vision assistive stand of FIG. 1.

FIG. 6 shows a base of the vision assistive stand of FIG. 1. As illustrated in FIG. 6, the configured receptacle member 20 is constructed of receptacle members 23 and 27, which form orthogonal channels 21, 22, 24, and 26, the orthogonal channels 21, 22, 24, and 26 being configured to match the orthogonal projections of the vertical arm 30, as illustrated in FIG. 5.

Although the projections of vertical arm 30 and the channels 21, 22, 24, and 26 of the configured receptacle member 20 have been illustrated as being orthogonal, the dimensional relationship may not be orthogonal.

Moreover, FIGS. 5 and 6 illustrate the vertical arm 30 as having four projections and the configured receptacle member 20 as having four orthogonal channels 21, 22, 24, and 26, the vertical arm 30 may have two projections and two channels, and the configured receptacle member may have corresponding channels and projections.

As further illustrated in FIG. 6, the configured receptacle member 20 is located at one end of the base 10 such that when the vertical arm 30 engages the configured receptacle member 20 and the horizontal attachment arm 50 is positioned, as illustrated in FIG. 2, the vertical arm 30, the base 10, and the horizontal attachment arm 50 form a C or U shape.

Figure 7:
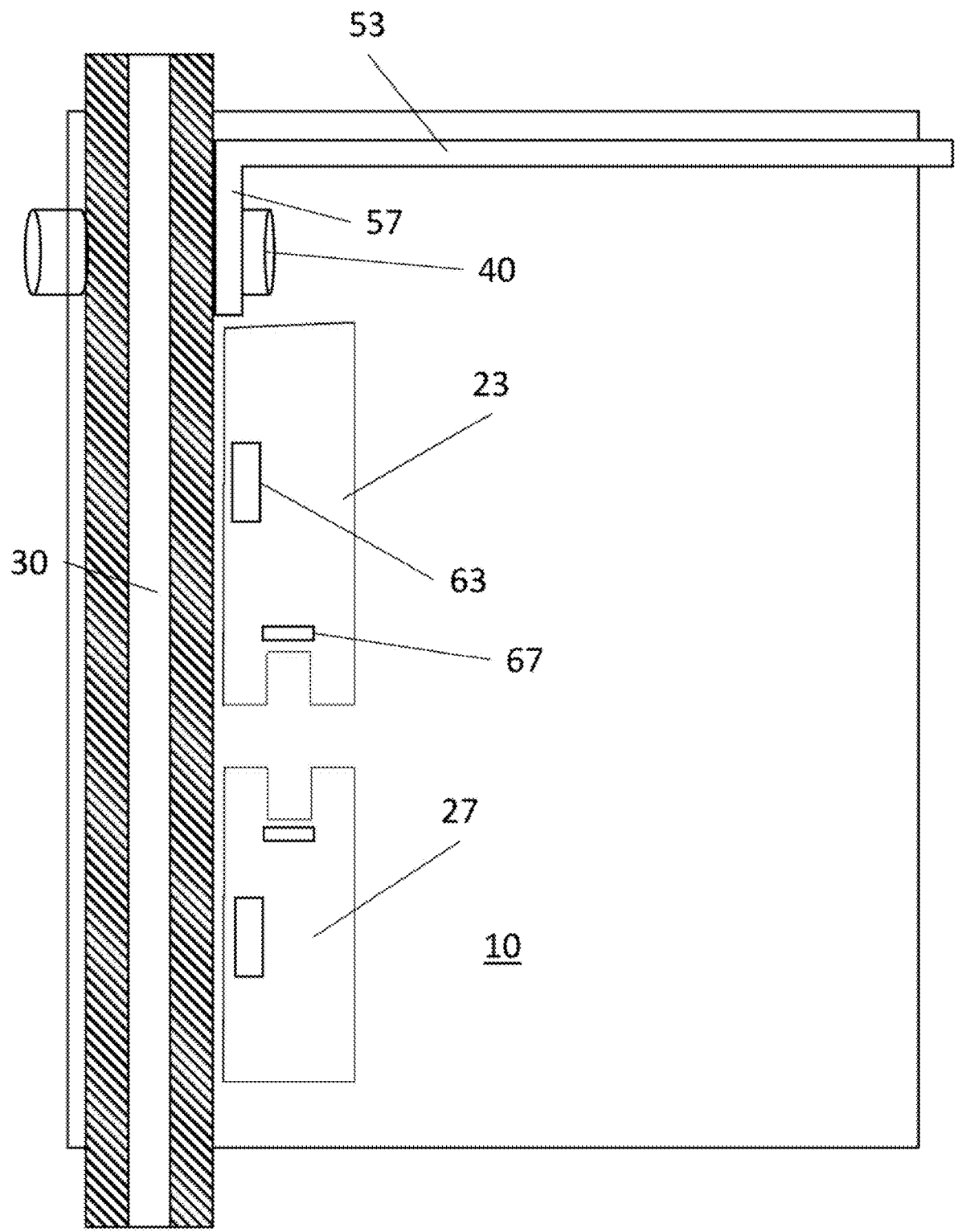
FIG. 7 shows a first transport configuration of the vision assistive stand of FIG. 1.
Figure 9:
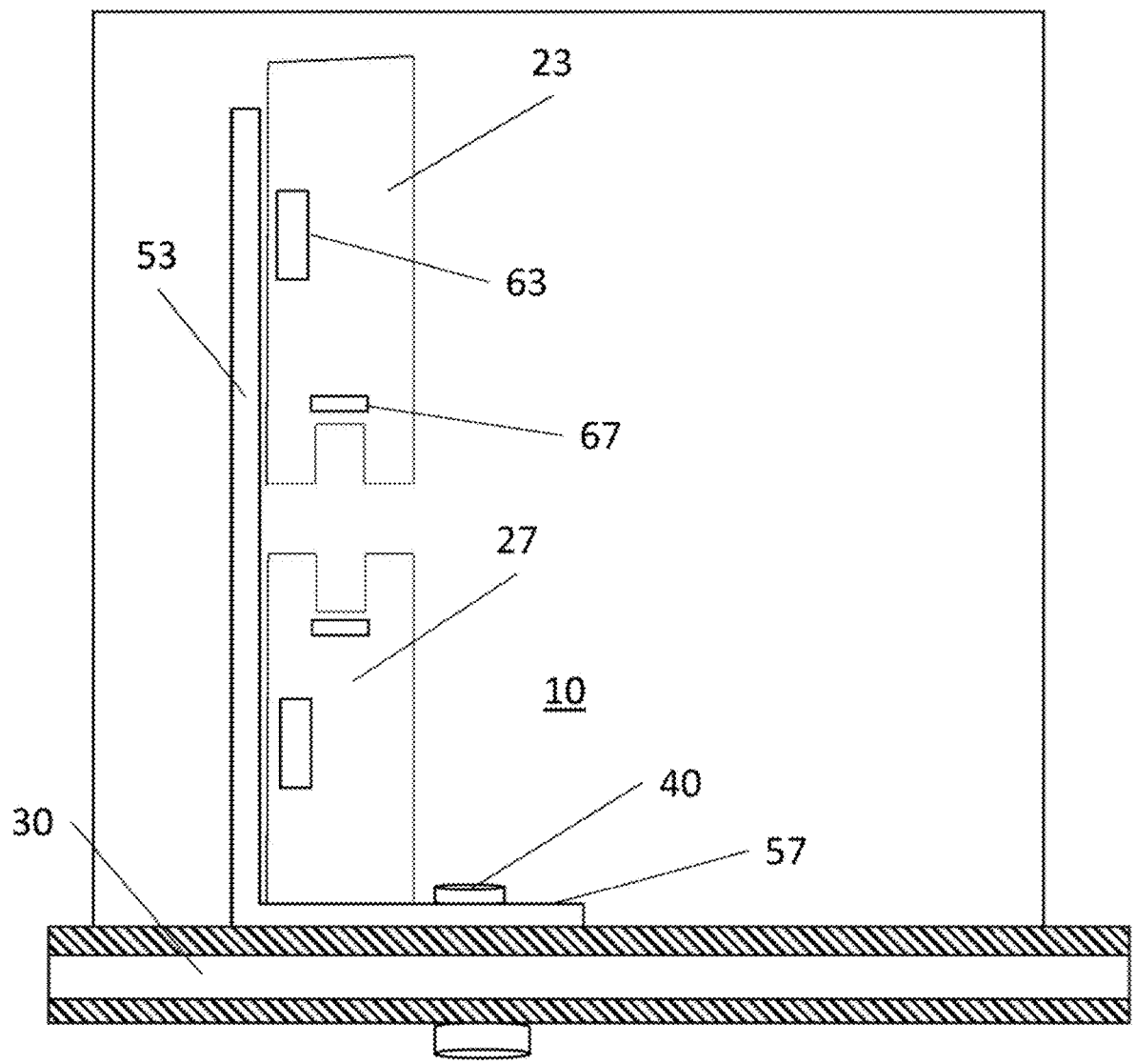
FIG. 9 shows a second transport configuration of the vision assistive stand of FIG. 1.

The configured receptacle member 20, as illustrated in FIG. 6, includes transporting magnets 63 to facilitate the attaching of the vertical arm 30 and the horizontal attachment arm 50 to the configured receptacle member 20, as illustrated in FIGS. 7 and 9, for easy transporting of the visual aid stand 100. The configured receptacle member 20, as illustrated in FIG. 6, includes receptacle magnets 67 to facilitate the attaching of the vertical arm 30 to the configured receptacle member 20.

More specifically, the configured receptacle member 20 may include receptacle magnets 67 to provide a more secure attachment of the vertical arm 30 (if the vertical arm 30 is constructed of a ferrous metal) to the base 10, via the configured receptacle member 20, while allowing easy removal.

It is noted that the vertical arm 30 may include magnets to provide a more secure attachment of the configured receptacle member 20 (if the configured receptacle member 20 is constructed of a ferrous metal or contains a piece or pieces of embedded ferrous material) to vertical arm 30, while allowing easy removal.

In other words, the vertical arm 30 and the configured receptacle member 20 have a magnetic relationship therebetween.

If the configured receptacle member 20 and vertical arm 30 are constructed of a non-ferrous material, the configured receptacle member 20 and the vertical arm 30 would have embedded, therein, polar opposite magnets to facilitate a more secure attachment of the vertical arm 30 to the base 10, via the configured receptacle member 20, while allowing easy removal.

It is noted that in another embodiment, the base 10 may include a magnet in the vicinity of the configured receptacle member 20 and the vertical arm 30 includes ferrous material to create a magnetic relationship therebetween so as to secure the vertical arm 30 to the base 10. Alternatively, in another embodiment, the base 10 may include ferrous material in the vicinity of the configured receptacle member 20 and the vertical arm 30 includes a magnet to create a magnetic relationship therebetween so as to secure the vertical arm 30 to the base 10.

FIG. 7 shows a first transport configuration of the vision assistive stand of FIG. 1. As illustrated in FIG. 7, the vertical arm 30 is positioned on the base 10 so that the transport magnets 63 can magnetically interact with the vertical arm 30 so as to secure the vertical arm 30 in a transporting position, as illustrated.

Figure 8:
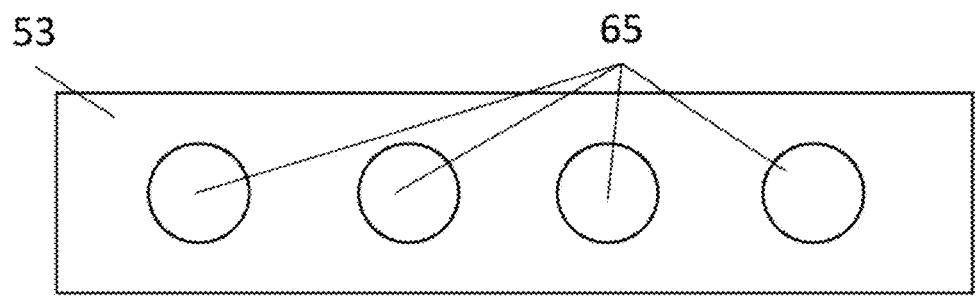
FIG. 8 shows a horizontal arm of an imaging device attachment member of the vision assistive stand of FIG. 1.

It is noted that magnets 65 (as illustrated in FIG. 8) in the imaging device support leg 53 of the L-shaped horizontal attachment arm 50 can be used to secure the vertical arm 30 to the configured receptacle member 20 in a transporting position. In this embodiment, the configured receptacle member 20 would contain a piece or pieces of embedded ferrous material.

It is noted that, as illustrated in FIG. 8, that the imaging device support leg 53 of the L-shaped horizontal attachment arm 50 includes attachment magnets 65 to enable the attachment of an imaging device, such as a smart phone or tablet, to the horizontal attachment arm 50. The imaging device may include a ferrous metal plate to enable engagement with the magnets 65 in the imaging device support leg 53 of the L-shaped horizontal attachment arm 50.

If the imaging device support leg 53 of the L-shaped horizontal attachment arm 50 does not include magnets 65, an imaging device accessory may be provided to provide the appropriate connection interface between the horizontal attachment arm 50 and the imaging device.

The attachment magnets 65 can also be used to secure the horizontal attachment arm 50 to the configured receptacle member 20 for secure transport if the horizontal attachment arm 50 is disassembled from the vertical arm 30.

FIG. 9 shows a second transport configuration of the vision assistive stand of FIG. 1. As illustrated in FIG. 9, the imaging device support leg 53 of the L-shaped horizontal attachment arm 50 is positioned on the base 10 so that the transport magnets 63 can magnetically interact with the imaging device support leg 53 of the L-shaped horizontal attachment arm 50 so as to secure the imaging device support leg 53 of the L-shaped horizontal attachment arm 50 and the vertical arm 30 in a transporting position, as illustrated.

It is noted that the attachment magnets 65 may provide the attachment function if the configured receptacle member 20 is constructed of ferrous material, or the transport magnets 63 may provide the attachment function if the imaging device support leg 53 of the L-shaped horizontal attachment arm 50 is constructed of ferrous material.

As shown in FIGS. 7 and 9, when disassembled, the vertical arm 30 can be laid flat on the base 10, but detachably attached to the base 10 via the magnets in the configured receptacle 20.

It is noted that the transport magnets 63 may be unnecessary because the receptacle magnets 67 may be strong enough to secure the vertical arm 30 to the base 10. In this embodiment, the receptacle magnets 67 provide the dual function of securing the vertical arm 30 in an assembled state and securing the vertical arm 30 in a disassembled state.

As illustrated in FIGS. 1-9, the vision assistive stand supports the use of a smart phone, mobile phone, or tablet enabling hands-free operation and provides multiple positions for a variety of viewing options. The vision assistive stand is collapsible to enable portability and to be conveniently stored in a carrying case.

The smart phone, mobile phone, or tablet attaches to the imaging device support leg 53 of the L-shaped horizontal attachment arm 50 with magnets. A one-time assembly of the metal plate to the phone or tablet is required. This plate may be adhered to the back of the phone with double sided tape.

The L-shaped horizontal attachment arm 50 can be lowered or raised by loosening the horizontal attachment arm locking mechanism 40. In addition, the L-shaped horizontal attachment arm 50 can be rotated 180 degrees to accentuate the amount of vertical travel. This adjustment can be used to optimize the magnifications and provide more effective document viewing.

The vision assistive stand can be positioned to the right, left, or top of a viewing document. Associated software, as described below, enables image rotation so that the document is viewed correctly on the device or external monitor.

The vision assistive stand supports multiple viewing positions such as horizontal document viewing, wherein the vision assistive stand is placed on the table or work surface so that lowering the height setting increases the magnification of the viewed document and raising the height setting decreases the magnification. It is noted that higher magnifications result in viewing just a portion of the document and may require the document to be moved left/right and top/bottom to view the full content. The highest magnification is achieved by rotating the L-shaped horizontal attachment arm 50 in a "down" position and lowering to the bottom of the adjustment slot.

On the other hand full document viewing can be realized by raising the L-shaped horizontal attachment arm 50 to its highest position, enabling the full document to be imaged on the screen. The highest position can be achieved by rotating the L-shaped horizontal attachment arm 50 to an "up" position. The onscreen image will appear small but this is most useful when taking a full image capture of the document.

In another state, vertical and distance viewing, the L-shaped horizontal attachment arm 50 can be rotated to view objects in the distance such as walls or classroom whiteboards. Loosening the horizontal attachment arm locking mechanism 40 will enable the L-shaped horizontal attachment arm 50 to rotate. Tightening the horizontal attachment arm locking mechanism 40 will hold the L-shaped horizontal attachment arm 50 in the vertical position, thereby enabling real time viewing or screen image capture to review at a later time.

Lastly, the L-shaped horizontal attachment arm 50 can be rotated to enable self-viewing.

Figure 10:
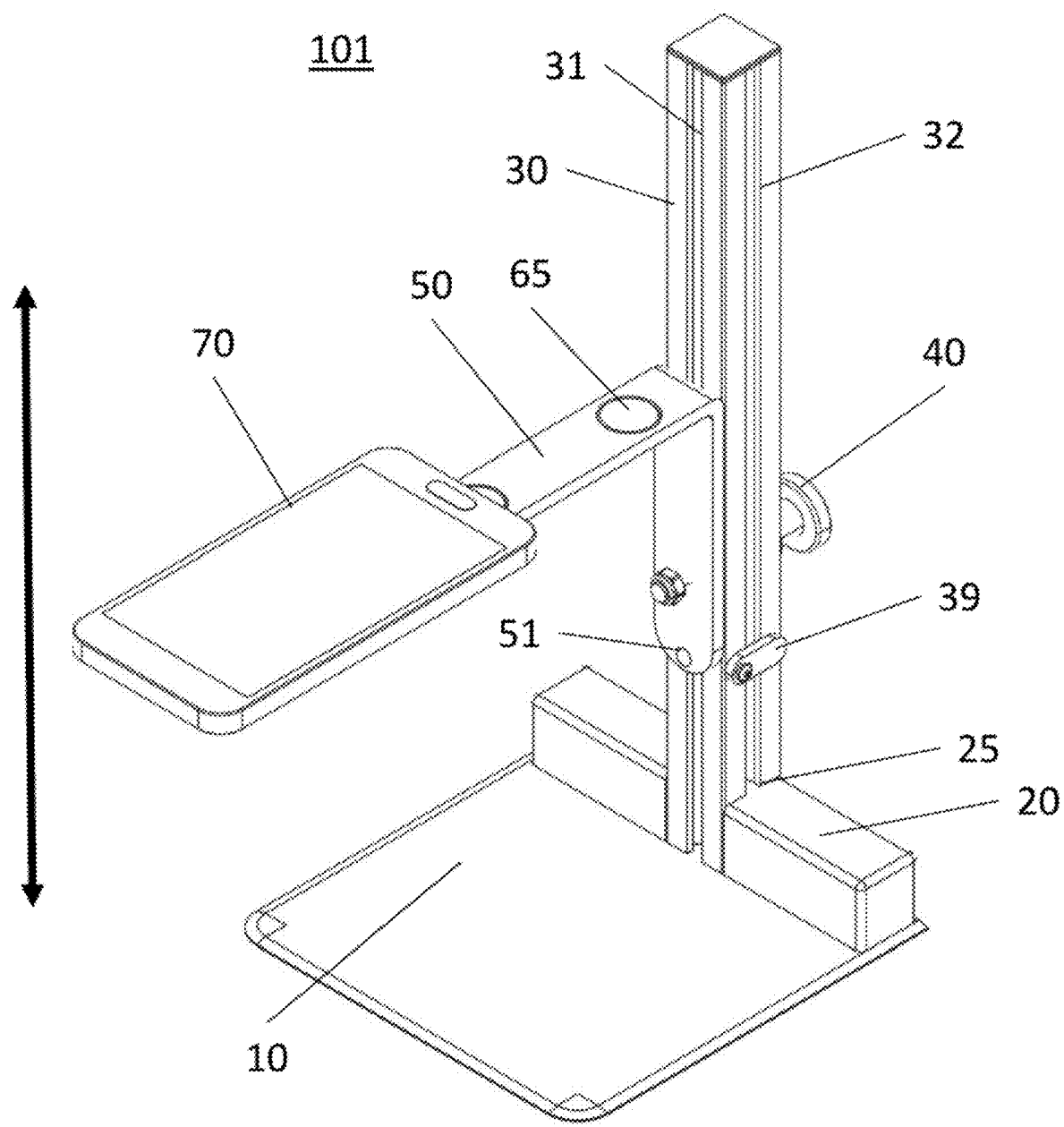
FIG. 10 shows another embodiment of a vision assistive stand for mounting an imaging device.

FIG. 10 illustrates another embodiment of a visual aid stand 101 that includes a base 10. The base 10 has sufficient weight and/or footprint to prevent toppling when an imaging device 70, such as a smartphone or tablet, is connected to a horizontal attachment arm 50.

The base 10 includes a configured receptacle member 20 (described in more detail below) for receiving a vertical arm 30 having a configuration corresponding to the configured receptacle member 20 to ensure proper attachment.

The vertical arm 30 includes a positioning mechanism for enabling vertical positioning (arrow) of the horizontal attachment arm 50.

In one embodiment, the positioning mechanism is a vertical slot 31 for receiving horizontal attachment arm locking mechanism 40 so that the horizontal attachment arm 50 can be positioned in a vertical fashion along the vertical channel. More specifically, the vertical slot 31 receives horizontal attachment arm locking mechanism 40 so that the horizontal attachment arm 50 can be positioned in a continuous vertical fashion along the vertical slot 31.

As illustrated in FIG. 10, the horizontal attachment arm locking mechanism 40 is a locking mechanism that clamps onto the vertical arm 30 by squeezing the opposite sides of the locking mechanism against the vertical arm 30.

The horizontal attachment arm locking mechanism 40 may allow the horizontal attachment arm 50 to be rotated 360° around the axis of the horizontal attachment arm locking mechanism 40 (See FIGS. 3 and 4).

As illustrated in FIG. 10, the horizontal attachment arm is an L-shaped member having a vertical arm attachment leg of the L-shaped horizontal attachment arm 50 engaging the vertical arm 30 and the horizontal attachment arm locking mechanism 40 and an imaging device support leg of the L-shaped horizontal attachment arm 50 projecting in an orthogonal fashion away from the vertical arm 30.

It is noted that the horizontal attachment arm locking mechanism 40 may be a thumb wheel, bolt, or screw.

The visual aid stand 101 further includes a rotation retainer device 51 to prevent rotation when the horizontal attachment arm locking mechanism 40 is being placed in a desire vertical position and rotational position.

As illustrated in FIG. 10, the vertical arm 30 includes channel 32 which corresponds to projection 25 in the configured receptacle member 20.

In one embodiment, the vertical arm 30 includes channels 32, on the face of the vertical arm 30, and the configured receptacle member 20 includes projection 25 to interface with a channel 32 of the vertical arm 30.

The vertical arm 30 also includes a cable retention tab or clamp 39 that can retain any cables running from the imaging device 70 within a channel 32 of the vertical arm 30 so that the cable or cables are secured in a fashion so as not to interfere with the image capture. The cable retention tab or clamp 39 may rotate to allow the cable access to the channel 32 and rotate back to secure the cable within the channel 32.

Figure 11:
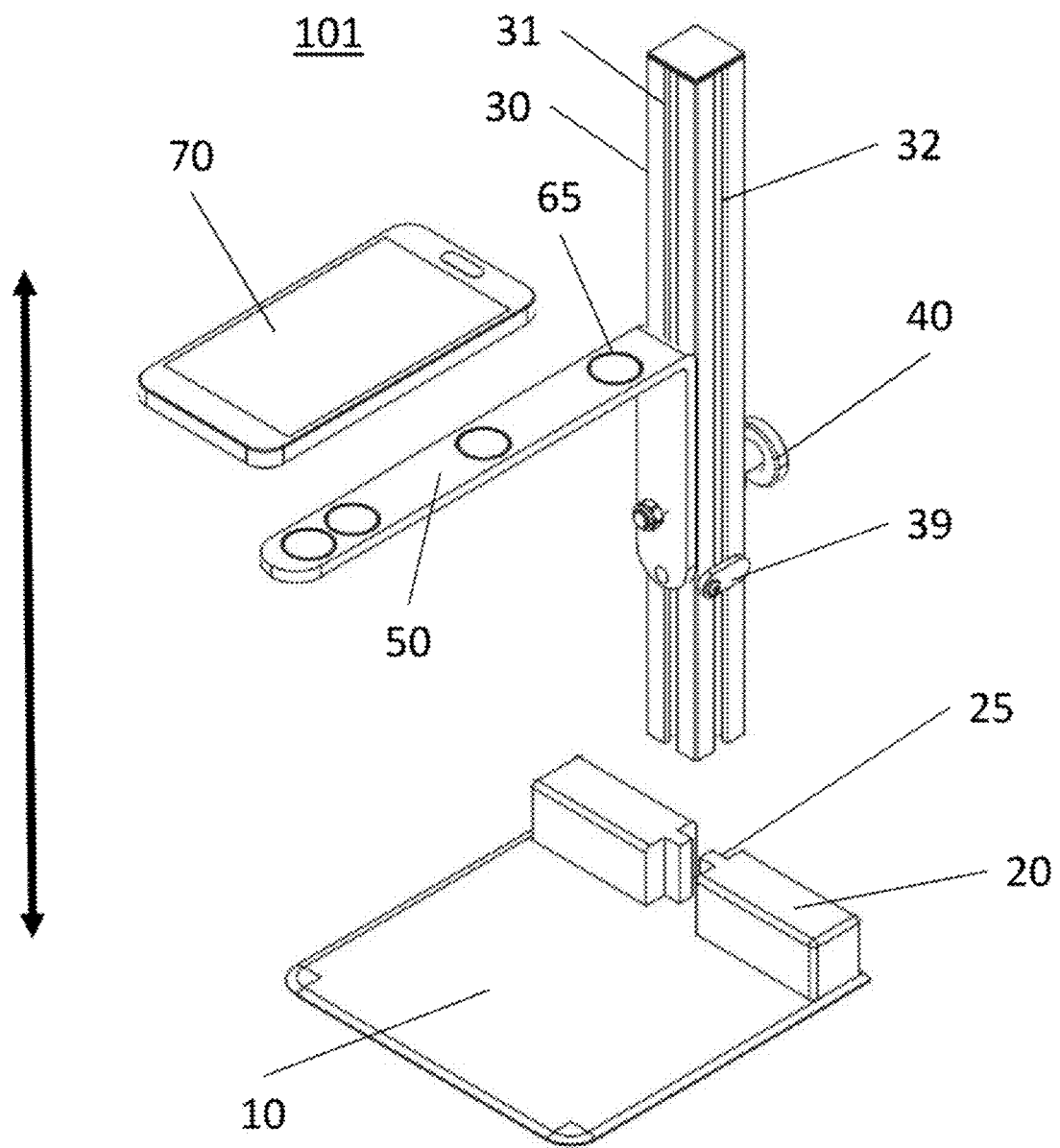
FIG. 11 shows a detached configuration of the vision assistive stand of FIG. 10.

FIG. 11 shows a first configuration of the vision assistive stand of FIG. 10. As illustrated in FIG. 11, the vertical arm 30 is disassembled from the configured receptacle member 20, and the imaging device 70 is disassembled from the L-shaped horizontal attachment arm 50.

As further illustrated in FIG. 11, the vertical arm 30 includes channel 32 which corresponds to projection 25 in the configured receptacle member 20.

It is noted that the imaging device 70 can be attached to the L-shaped horizontal attachment arm 50 via magnets 65 located within the L-shaped horizontal attachment arm 50, as illustrated in FIG. 11.

Figure 12:
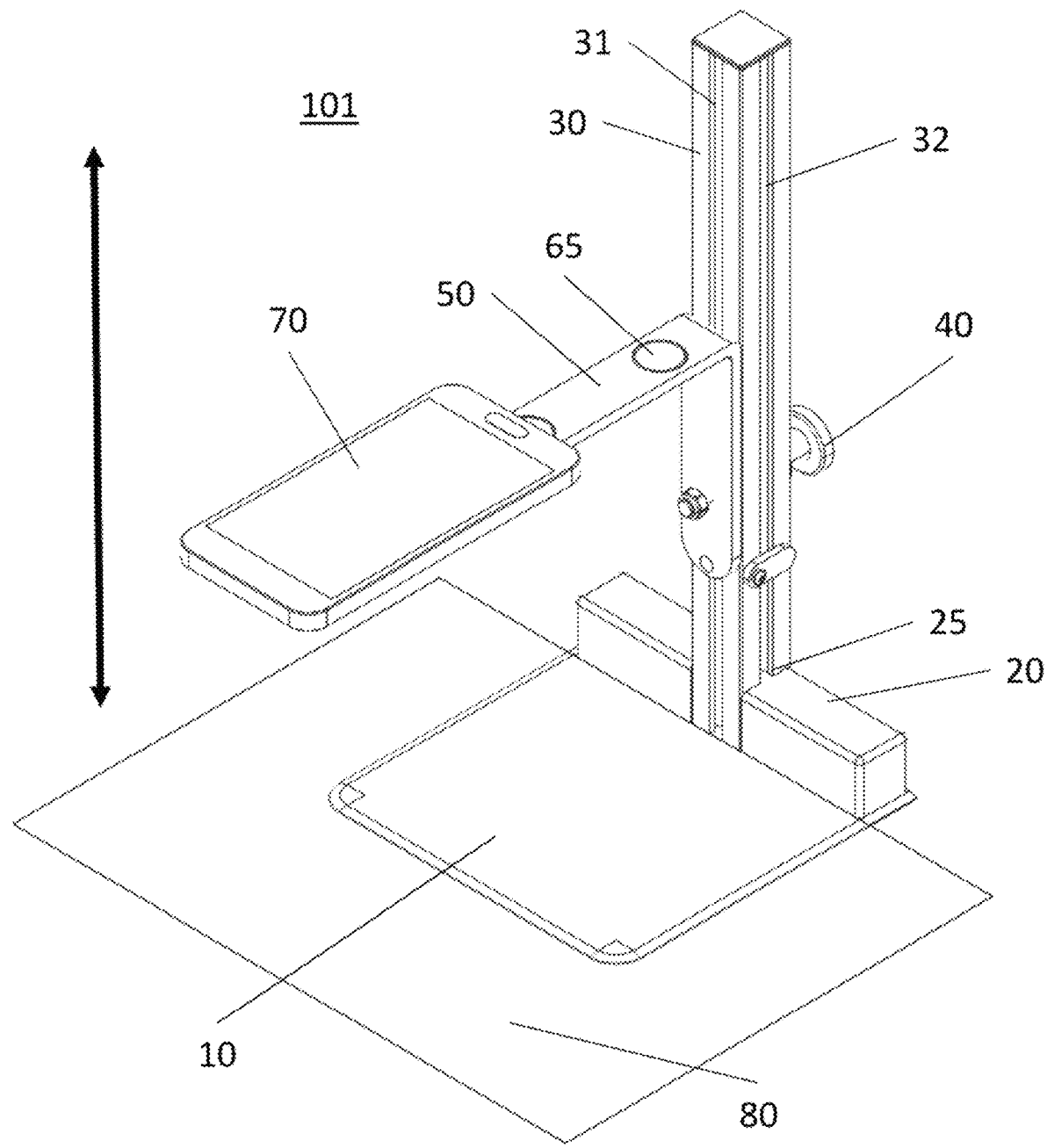
FIG. 12 shows a attached configuration of the vision assistive stand of FIG. 10.

FIG. 12 shows a second configuration of the vision assistive stand of FIG. 10. As illustrated in FIG. 12, the imaging device support leg of the L-shaped horizontal attachment arm 50 projects in an orthogonal fashion away from the vertical arm 30. The horizontal attachment arm 50 is positioned in a vertical direction at a lower end of the vertical arm 30 to enable realization of a maximum magnification of the document 80 depending upon the imaging device being used.

Figure 13:
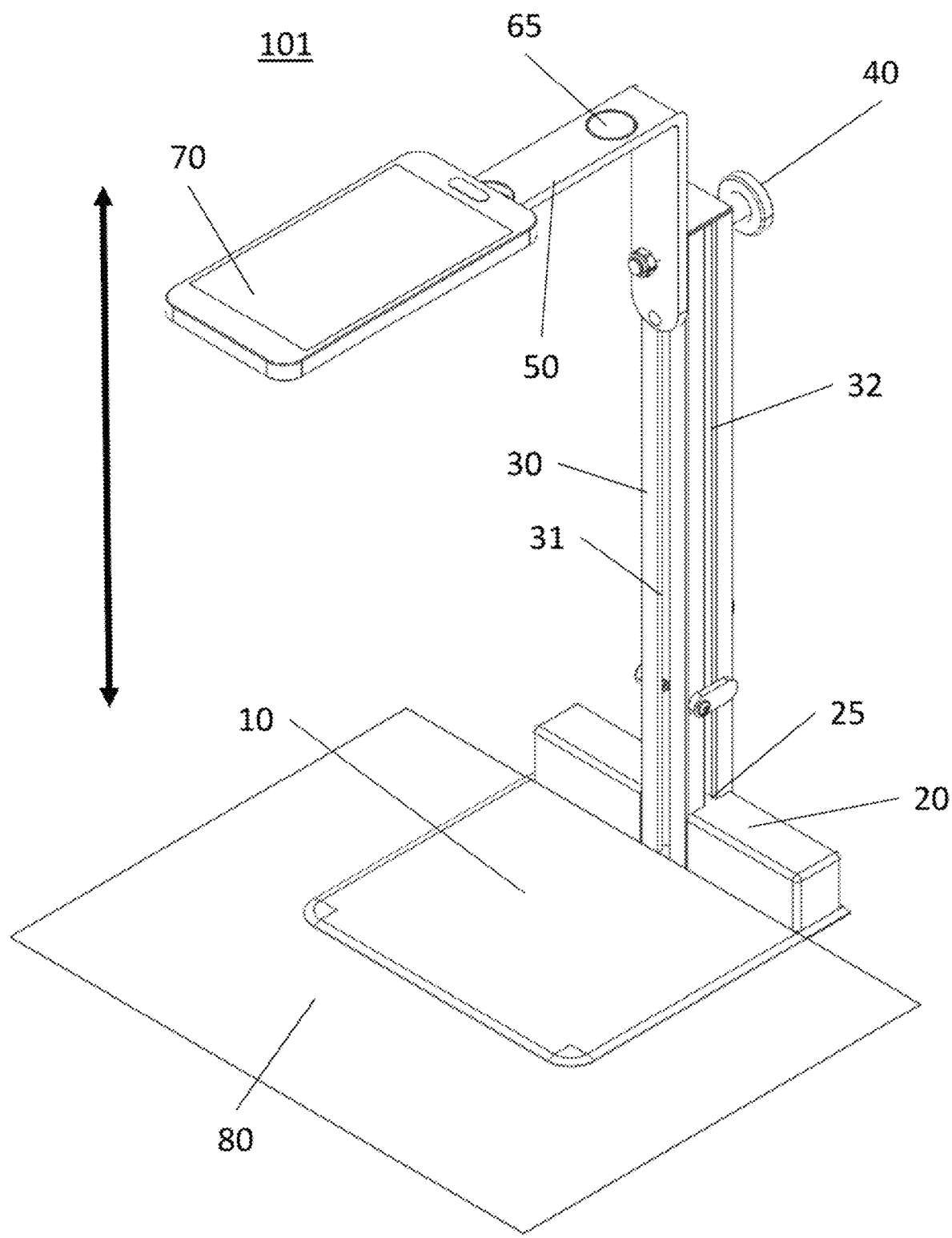
FIG. 13 shows an entire page display configuration of the vision assistive stand of FIG. 10.

FIG. 13 shows a third configuration of the vision assistive stand of FIG. 10. As illustrated in FIG. 13, the imaging device support leg of the L-shaped horizontal attachment arm 50 projects in an orthogonal fashion away from the vertical arm 30. The horizontal attachment arm 50 is positioned in a vertical direction at an upper end of the vertical arm 30 to realize the maximum amount of the document 80.

In the embodiments illustrated in FIGS. 10-13, the horizontal attachment arm 50 may be rotated 360° so that the imaging device 70 can capture a document 80 positioned on the base 10 or an image on a wall.

Figure 14:
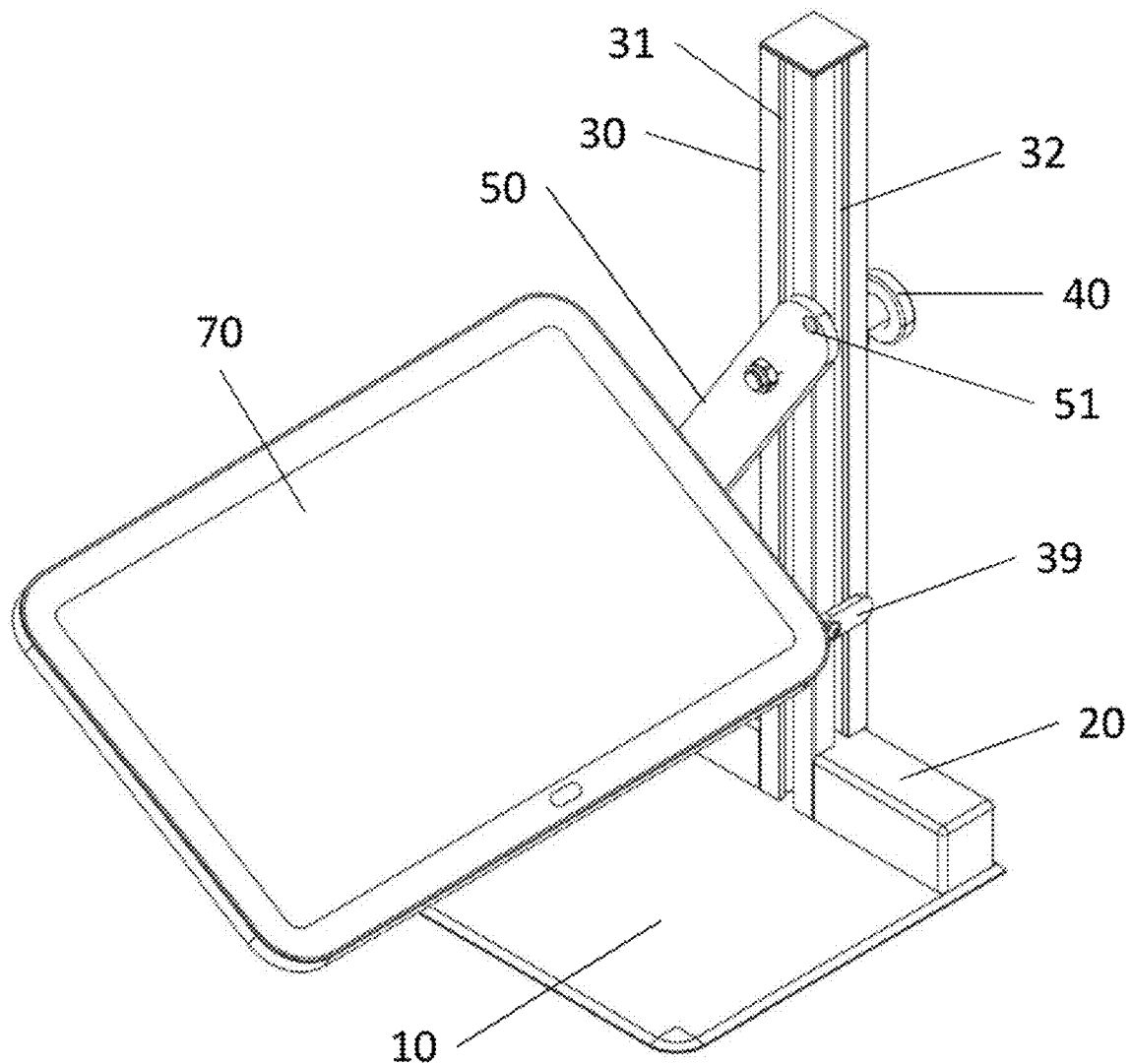
FIG. 14 shows a fourth configuration of the vision assistive stand of FIG. 10.

FIG. 14 illustrates another view of a visual aid stand 101 that includes a base 10. The base 10 has sufficient weight and/or footprint to prevent toppling when an imaging device 70, such as a smartphone or tablet, is connected to a horizontal attachment arm 50.

The base 10 includes a configured receptacle member 20 (described in more detail below) for receiving a vertical arm 30 having a configuration corresponding to the configured receptacle member 20 to ensure proper attachment.

The vertical arm 30 includes a positioning mechanism for enabling vertical positioning (arrow) of the horizontal attachment arm 50.

In one embodiment, the positioning mechanism is a vertical slot 31 for receiving horizontal attachment arm locking mechanism 40 so that the horizontal attachment arm 50 can be positioned in a vertical fashion along the vertical channel. More specifically, the vertical slot 31 receives horizontal attachment arm locking mechanism 40 so that the horizontal attachment arm 50 can be positioned in a continuous vertical fashion along the vertical slot 31.

As illustrated in FIG. 14, the horizontal attachment arm locking mechanism 40 is a locking mechanism that clamps onto the vertical arm 30 by squeezing the horizontal attachment arm 50 against the vertical arm 30.

The horizontal attachment arm locking mechanism 40 may allow the horizontal attachment arm 50 to be rotated 360° around the axis of the horizontal attachment arm locking mechanism 40 (See FIGS. 3 and 4).

As illustrated in FIG. 14, the horizontal attachment arm is an L-shaped member having a vertical arm attachment leg of the L-shaped horizontal attachment arm 50 engaging the vertical arm 30 and the horizontal attachment arm locking mechanism 40 and an imaging device support leg of the L-shaped horizontal attachment arm 50 projecting in an orthogonal fashion away from the vertical arm 30.

It is noted that the horizontal attachment arm locking mechanism 40 may include a thumb wheel, bolt, or screw.

The visual aid stand 101 further includes a rotation retainer device 51 to prevent rotation when the horizontal attachment arm locking mechanism 40 has been placed in a desire vertical position and rotational position.

It is noted that the vertical arm 30 may include indentations or recesses (not shown) at predetermined vertically differentiated locations to engage the rotation retainer device 51. These indentations or recesses may be at locations associated with optimal focus distances for various imaging devices. The indentations or recesses enable fast positioning of the L-shaped horizontal attachment arm 50 as well as adds further retention function to prevent of the L-shaped horizontal attachment arm 50.

As illustrated in FIG. 14, the vertical arm 30 includes channels 32 with correspond to projections in the configured receptacle member 20.

The vertical arm 30 also includes a cable retention tab or clamp 39 that can retain any cables running from the imaging device 70 within a channel 32 of the vertical arm 30 so that the cable or cables are secured in a fashion so as not to interfere with the image capture. The cable retention tab or clamp 39 may rotate to allow the cable access to the channel 32 and rotate back to secure the cable within the channel 32.

Lastly, the visual aid stand 101 further includes a rotation retainer device 51 to prevent rotation when the horizontal attachment arm locking mechanism 40 has been placed in a desire vertical position and rotational position.

When the horizontal attachment arm locking mechanism 40 has been placed in a desire vertical position and the vertical arm attachment leg of the L-shaped horizontal attachment arm 50 is positioned so that the vertical arm attachment leg of the L-shaped horizontal attachment arm 50 is parallel with the vertical arm 30, the rotation retainer device 51 is located within the vertical channel 31 to prevent rotation of the L-shaped horizontal attachment arm 50 and the imaging device 70.

Figure 15:
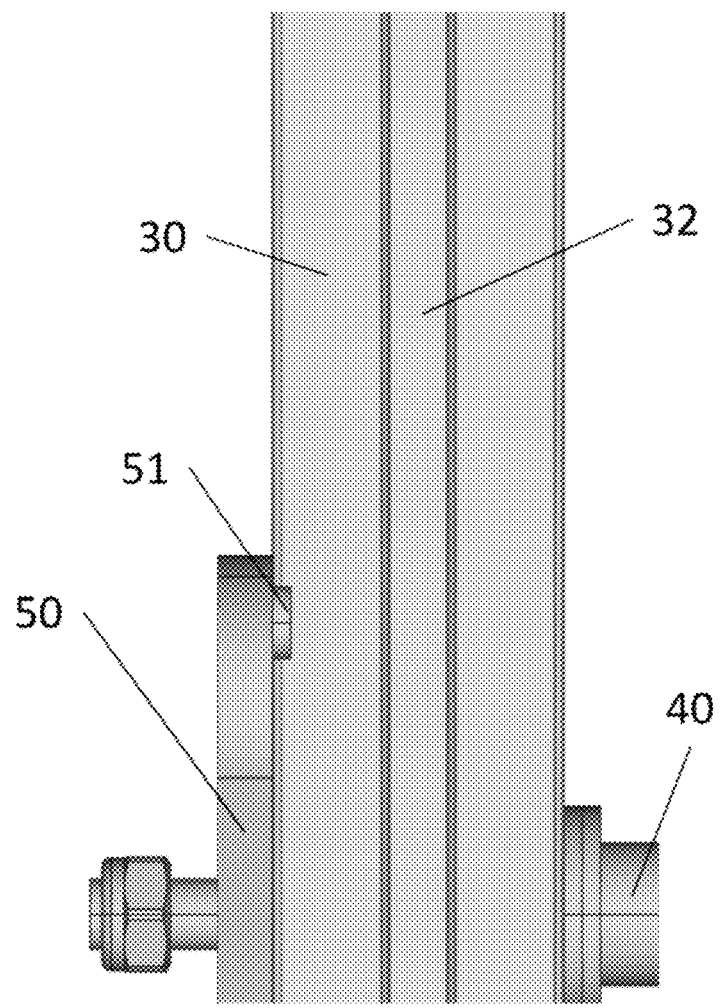
FIG. 15 illustrates a close-up of the rotation retainer device of the configuration of FIG. 14.

When the horizontal attachment arm locking mechanism 40 has been placed in a desire vertical position and the vertical arm attachment leg of the L-shaped horizontal attachment arm 50 is positioned so that the vertical arm attachment leg of the L-shaped horizontal attachment arm 50 is not parallel with the vertical arm 30, the rotation retainer device 51 is located to the side of the vertical arm 30, as illustrated in FIG. 15, to prevent rotation of the L-shaped horizontal attachment arm 50 and the imaging device 70.

More specifically, as illustrated in FIG. 15, the rotation retainer device 51 is not located within the vertical channel 31, but is positioned to a side of the vertical arm 30 to prevent rotation of the L-shaped horizontal attachment arm 50 and the imaging device 70.

Figure 16:
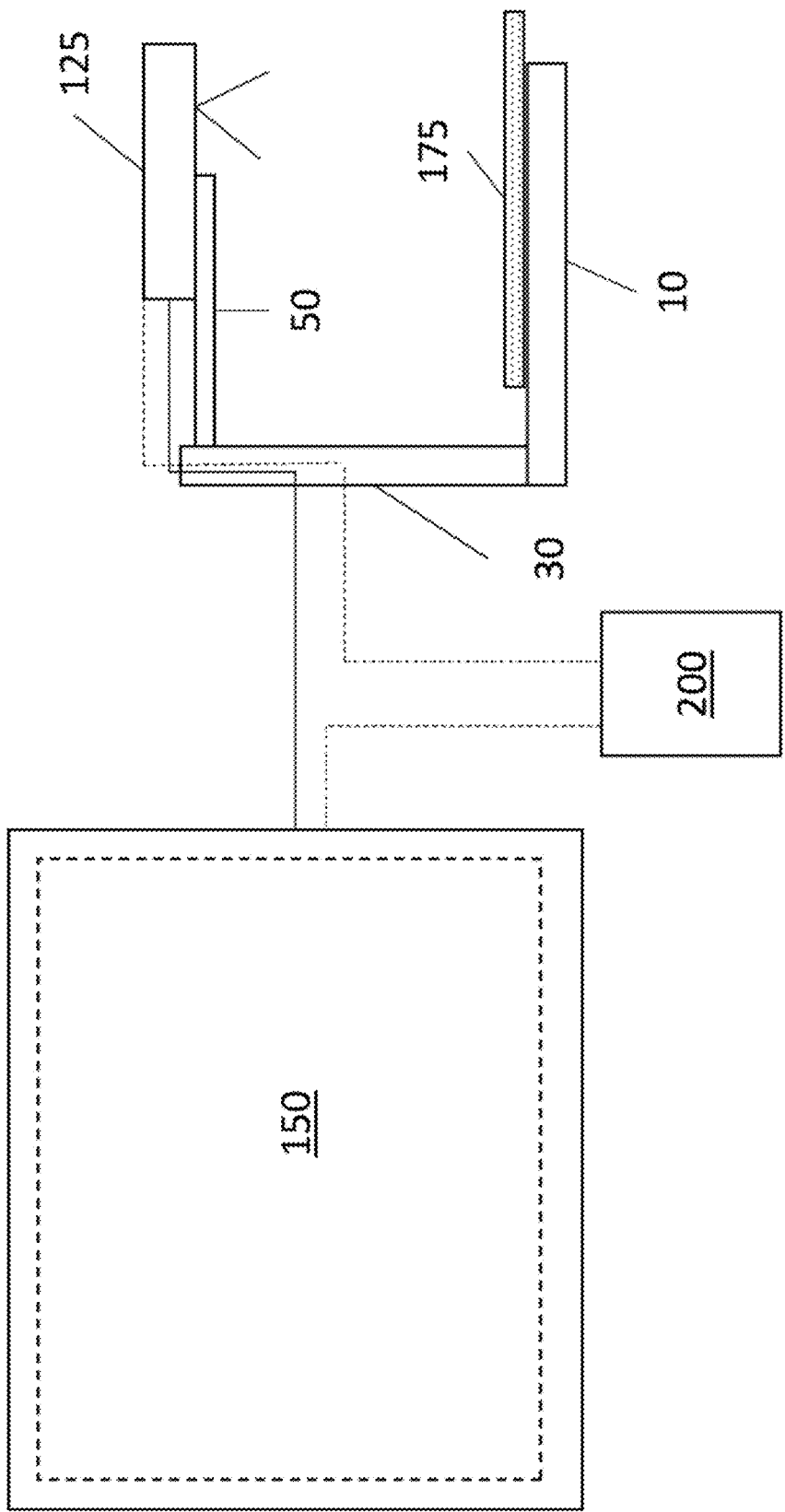
FIG. 16 shows provide a vision assistive system using the vision assistive stand of FIG. 1 or FIG. 10.

FIG. 16 shows provide a vision assistive system using the vision assistive stand of FIG. 1. As illustrated in FIG. 16, the vision assistive system includes a vision assistive stand having a base 10, a vertical arm 30, and a horizontal attachment arm 50. On the base, a user can place a document 175 for imaging by the imaging device 125 attached to the horizontal attachment arm 50.

The imaging device 125 is operatively connected (wired or wireless) to a display system 150 that includes a display device and a processor. The vision assistive system further includes a keypad 200. The keypad 200 may be operatively connected (wired or wirelessly) to the display system 150 to assist the user in controlling the imaging and the display if the display system 150 does not include an input device such as a keyboard, keypad, or touchscreen. If the display system 150 does not include a processor, but is merely a stand-alone display screen, the keypad 200 may be operatively connected (wired or wirelessly) to the imaging device 125 to assist the user in controlling the imaging and the display.

Figure 17:
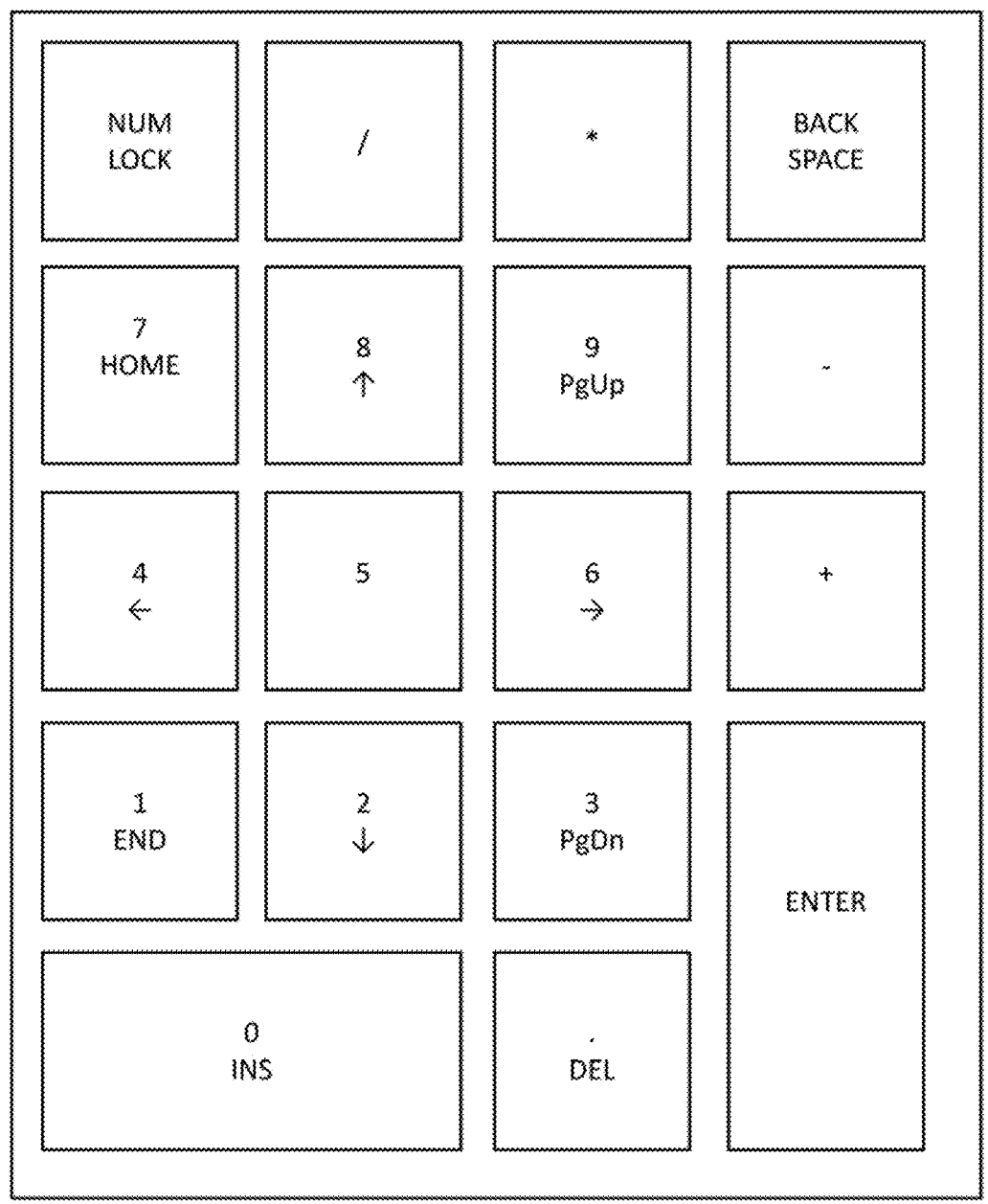
FIG. 17 shows a prior art keypad.

FIG. 17 shows a prior art keypad 210 that includes, as illustrated, the following keys: "NUM LOCK;" "/;" "*;" "BACKSPACE;" "7;" "8;" "9;" "−;" "4;" "5;" "6;" "+;" "1;" "2;" "3;" "ENTER;" "0;" and "DEL."

As illustrated in FIG. 16, an external keypad 200 is used to control the imaging process (visual assistance process). Use of a keypad allows full control without the need to touch the phone, or tablet, once it has been set up on the vision assistive stand.

As illustrated in FIG. 17, a conventional keypad is used, wherein each of the keys has a predefined name, such as "Enter," "Arrow Up," or number. FIGS. 18-22 shows the hot key functions of the keys with respect to the mode or state of the imaging process (visual assistance process).

A hot key, for the purposes of this description, refers to the functionality associated with the activation of the key as determined by the program or application being executed. The functionality may not necessarily correspond to the physical label, visually perceivable, on the key.

For example, a key may have the physical label, visually perceivable, "1," which corresponds to the function of inputting the numeric value 1 or alphanumeric value 1 when the program or application being executed has not assigned a "hot" function to the key.

However, the program or application being executed may assign a "hot" function of "change color" to the key having the physical label, visually perceivable, "1," such that when the user activates the key having the physical label, visually perceivable, "1," the program or application being executed interprets the input as a change color instruction, not the function of inputting the numeric value 1 or alphanumeric value 1.

In a "hot" key situation, the labelling on the physical key remains the same, but the functionality associated therewith changes. It is noted that the "hot" key functionality can be readily displayed on a display screen, as a virtual key, so that the user is informed of the "hot" key functionality.

If the keypad is a touch screen, the labelling of the keys is dynamic and thus the functionality of the "hot" key can be displayed directly in association with the physical activatable key on the touch screen.

As illustrated in FIGS. 18-22, it is noted that the "/" key, hot key "MIC On/Off," can be turned ON and OFF for voice input at any time by hitting the "/" key from any screen.

Figure 18:
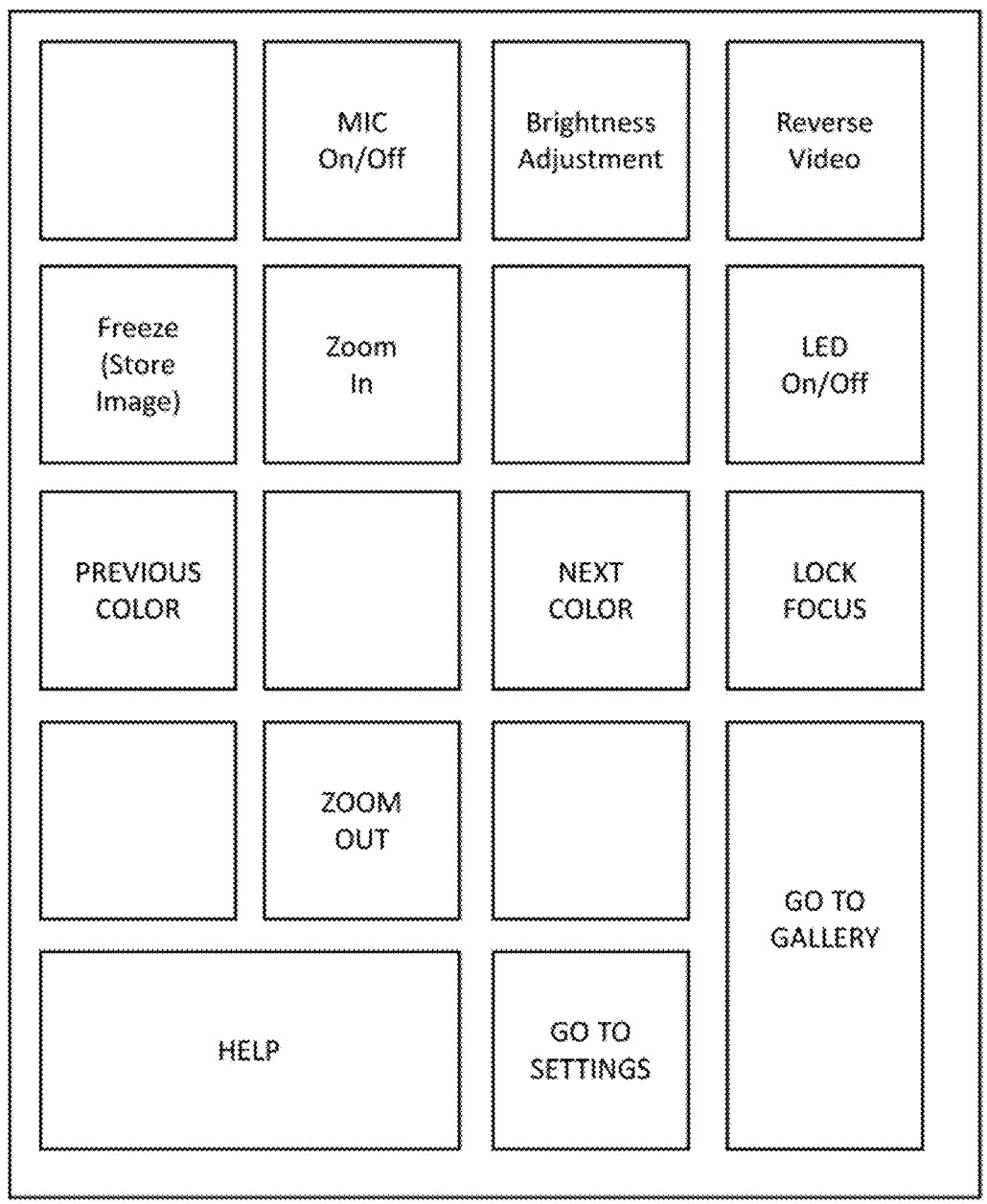
FIG. 18 shows a hot key configuration for a keypad utilized in the vision assistive system of FIG. 16.

FIG. 18 shows a hot key configuration for a keypad utilized in the vision assistive system of FIG. 16. As illustrated in FIG. 18, the hot key configuration shows all the functions that can be performed with the keys on the keypad for the viewing of live images.

As shown in FIG. 18, the functions that are available zoom in and out and to select the color mode that is most appropriate for viewing images. Another function is to capture a live image for closer inspection. The captured image will be frozen and displayed on an off-line mode screen. It is also saved a gallery for future viewing.

More specifically, as illustrated in FIG. 18, with the up and down arrow zoom keys, the live image can be magnified or reduced. The left and right arrow keys changes the color of the live image that is being viewed.

The color choices are: Normal color, as the images appear in real life; Gray, as the images appear in real life but without color; High contrast image with lightest and darkest objects represented by just two colors; Blue on Yellow; Yellow on Blue; Black on Yellow; Yellow on Black; White on Red; Red on White; White on Blue; or Blue on White.

Additionally, the "Home" key freezes the live image when, for example, the live image is moving around too much. The same up, down, left and right arrow keys can be used to zoom or change the color of the frozen image. Hitting the "Home" key will return to the live image again. Note that once the image is frozen, it is also stored in the gallery and can be brought back for viewing in the future.

Brightness of the live image can be changed with the "*" key. Tapping the "*" key will brighten the live image. Repeated tapping of the "*" key will continue to brighten the image until it is at the brightest possible setting. At that point tapping the "*" key will decrease the brightness until lowest brightness is reached and brightness starts increasing again. The brightness icon appearance will change as brightness is adjusted reflecting the current brightness adjustment level.

The "−" key turns the LED (Light Emitting Diode) ON and OFF. This helps provide illumination for an image that is being viewed.

The "+" key toggles between auto and fixed focus. In autofocus mode, the camera on the phone, or tablet, will automatically seek the best focus for the image being viewed.

Lastly, FIG. 18 shows that a user can navigate to other screens by selecting: "Go To Gallery," "Go To Settings," or "Help."

Figure 19:
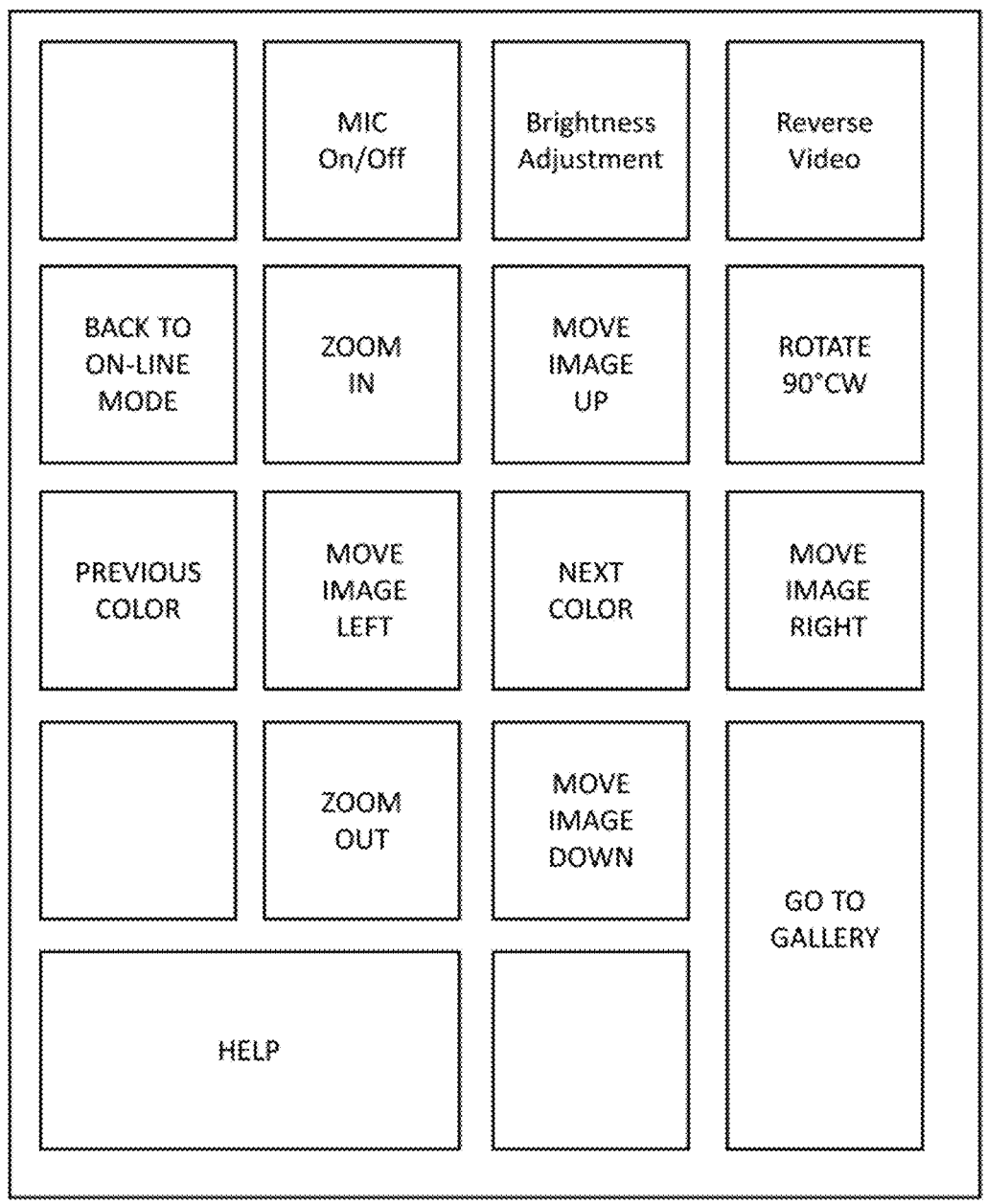
FIG. 19 shows a hot key configuration for a keypad utilized in the vision assistive system of FIG. 16.

FIG. 19 shows a hot key configuration for a keypad utilized in the vision assistive system of FIG. 16. As illustrated in FIG. 19, the hot key configuration shows all the functions that can be performed with the keys on the keypad for the viewing of stored images.

More specifically, when the live image is frozen, the live image is stored in the gallery and got brought back for viewing in the offline mode. All information of the image has been stored. Thus, it is possible to make further adjustments on the stored image when brought back for viewing.

When an image is magnified, it is possible to move the captured image around to make close inspection of the stored image. To move the store image around to look at different sections, the physical keys associated with "5,", "+," "PgUp," and "PgDn" are used to move the magnified image left, right, up or down, respectively.

As further illustrated in FIG. 19, brightness and orientation of the stored image being displayed can be changed with physical keys associated with "*" and "−" respectively.

As in the Online mode, tapping the "*" key will brighten the stored image being displayed. Multiple taps of the physical "*" key will continue to brighten the image but the brightness control will wrap around. That is, when the brightest image is reached, the next tap on the physical "*" key will return to the darkest version of the image.

Tapping the physical "−" key each time rotates the display of the stored image by 90 degrees clockwise. Rotation continues on each "−" key tap and can rotate the image back to the upright position.

Figure 20:
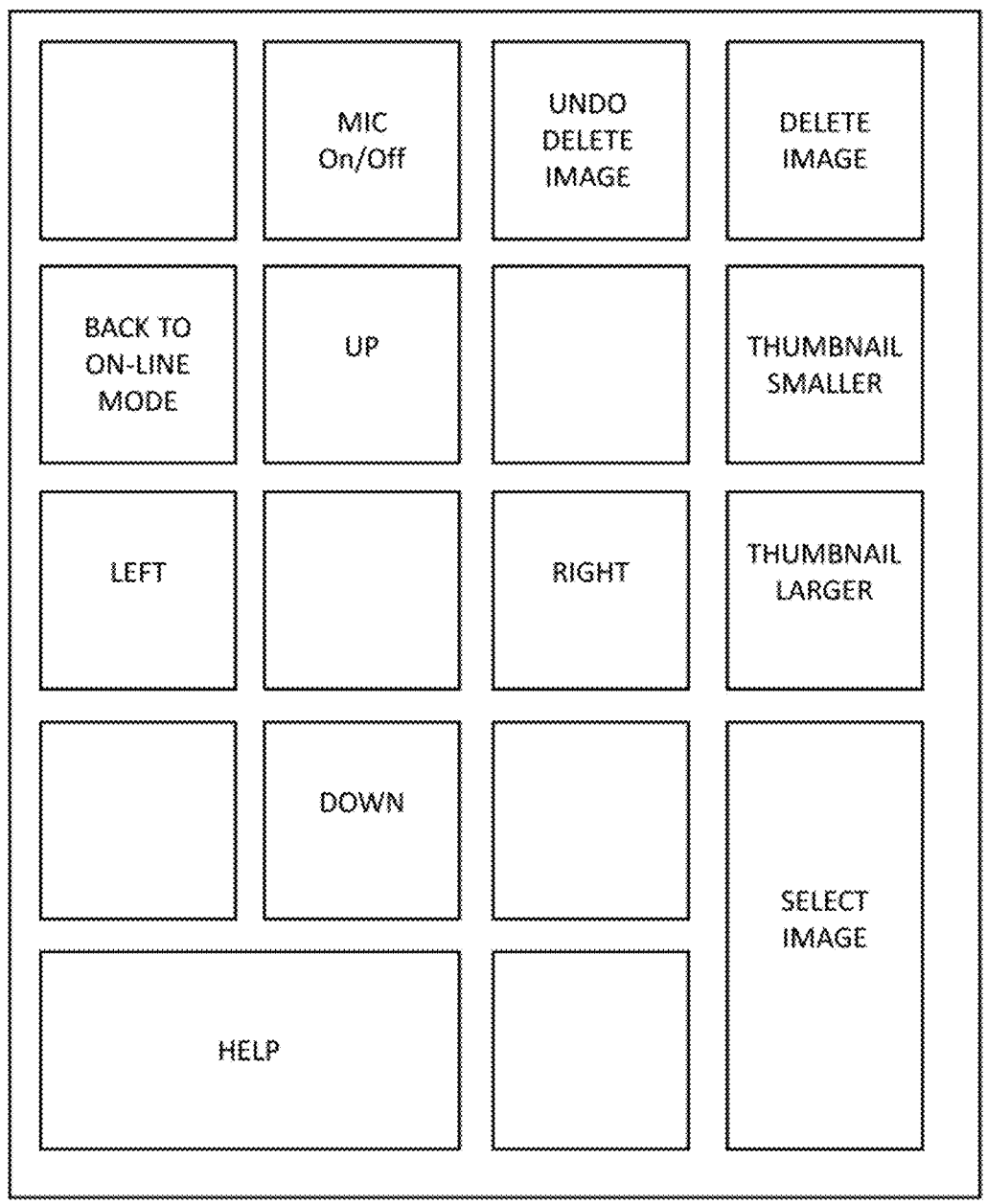
FIG. 20 shows a hot key configuration for a keypad utilized in the vision assistive system of FIG. 16.

FIG. 20 shows a hot key configuration for a keypad utilized in the vision assistive system of FIG. 16. As illustrated in FIG. 20, the hot key configuration shows all the functions that can be performed with the keys on the keypad for navigating the gallery.

As illustrated in FIG. 20, the physical "Arrow" keys are used to move around the gallery screen to inspect and highlight thumbnails on the gallery screen. Activation of one of the physical "Arrow" keys moves the cursor (highlighted thumbnail) is the corresponding direction so as to move the cursor to the next thumbnail, which is subsequently highlighted.

It is noted that thumbnails will scroll up and down the screen, as appropriate, when there are too many thumbnails to fit on the gallery screen.

The size of the thumbnails can be changed so more thumbnails can fit on the gallery screen by activating the physical "+" and "−" keys, wherein the keys are used to increase and decrease the thumbnail size, respectively.

Images in the Gallery are displayed as thumbnails per the moment that the live image was frozen or from the last time that the stored image was viewed and modified. When the thumbnail of a stored image is highlighted, it can be deleted with the physical "Backspace" key.

The physical "*" key can be used to undo the delete function. Also, the physical "return" key selects the highlighted thumbnail image to be opened up in the off-line screen for viewing.

Figure 21:
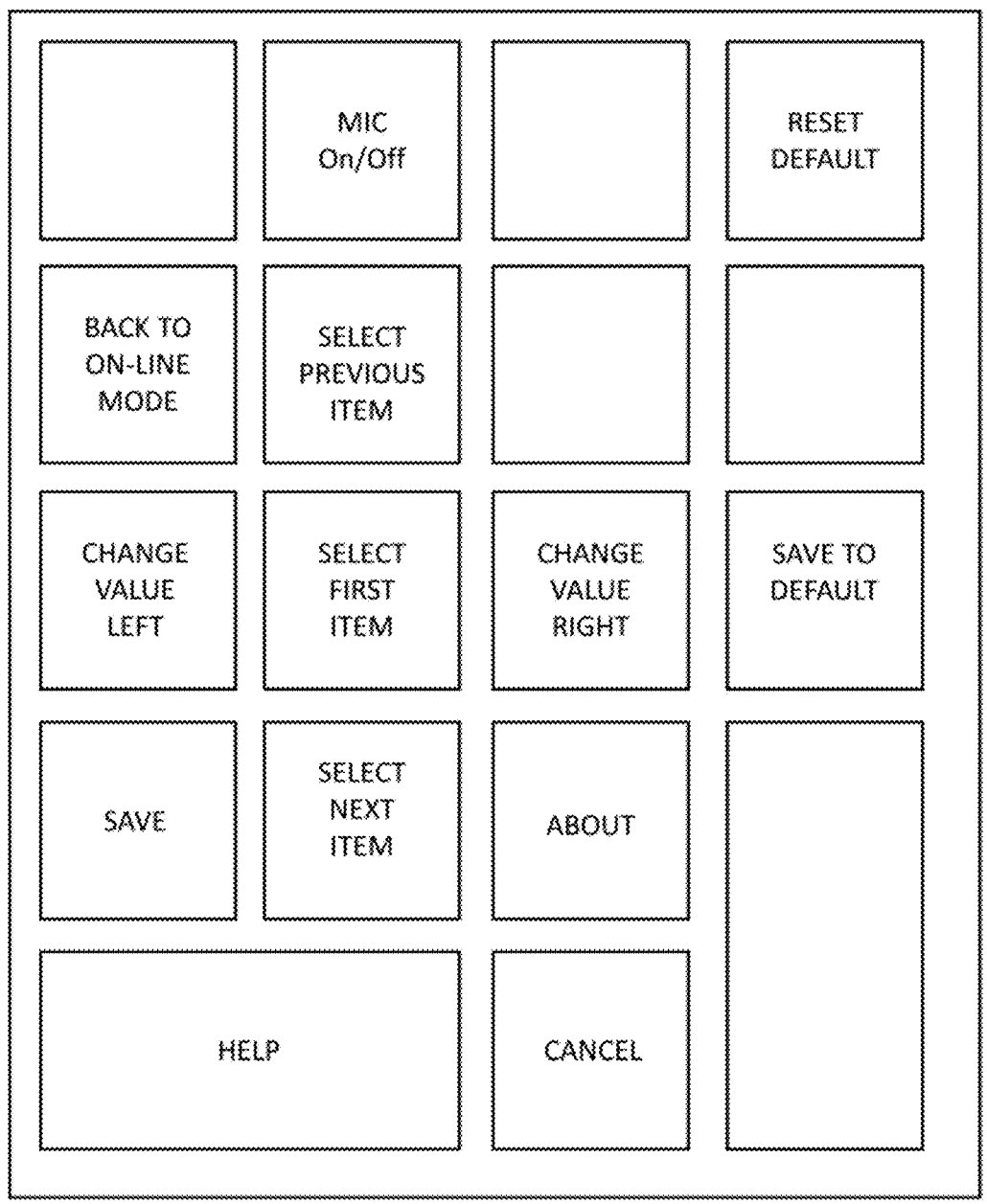
FIG. 21 shows a hot key configuration for a keypad utilized in the vision assistive system of FIG. 16.

FIG. 21 shows a hot key configuration for a keypad utilized in the vision assistive system of FIG. 16. As illustrated in FIG. 21, the hot key configuration shows all the functions that can be performed with the keys on the keypad for controlling settings.

More specifically, the physical "up" and "down" arrow keys select which setting item to change, and the physical "left" and "right" arrow keys scroll through the settable values. The physical "5" key is a shortcut to move back to the first item of the settings list.

The physical "+" key will change all the setting values to the current settings. This is useful for a user to adjust the images for magnification, color mode, etc. to desired conditions and use the physical "+" key to set these values as default. The saved default values will be used when the application or program is launched.

The physical "Backspace" key is used to reset all the setting values to the "factory default." A pop-up window may appear on the screen to ask for a confirmation for this reset request. The physical "Del" key cancels resetting to factory defaults.

Figure 22:
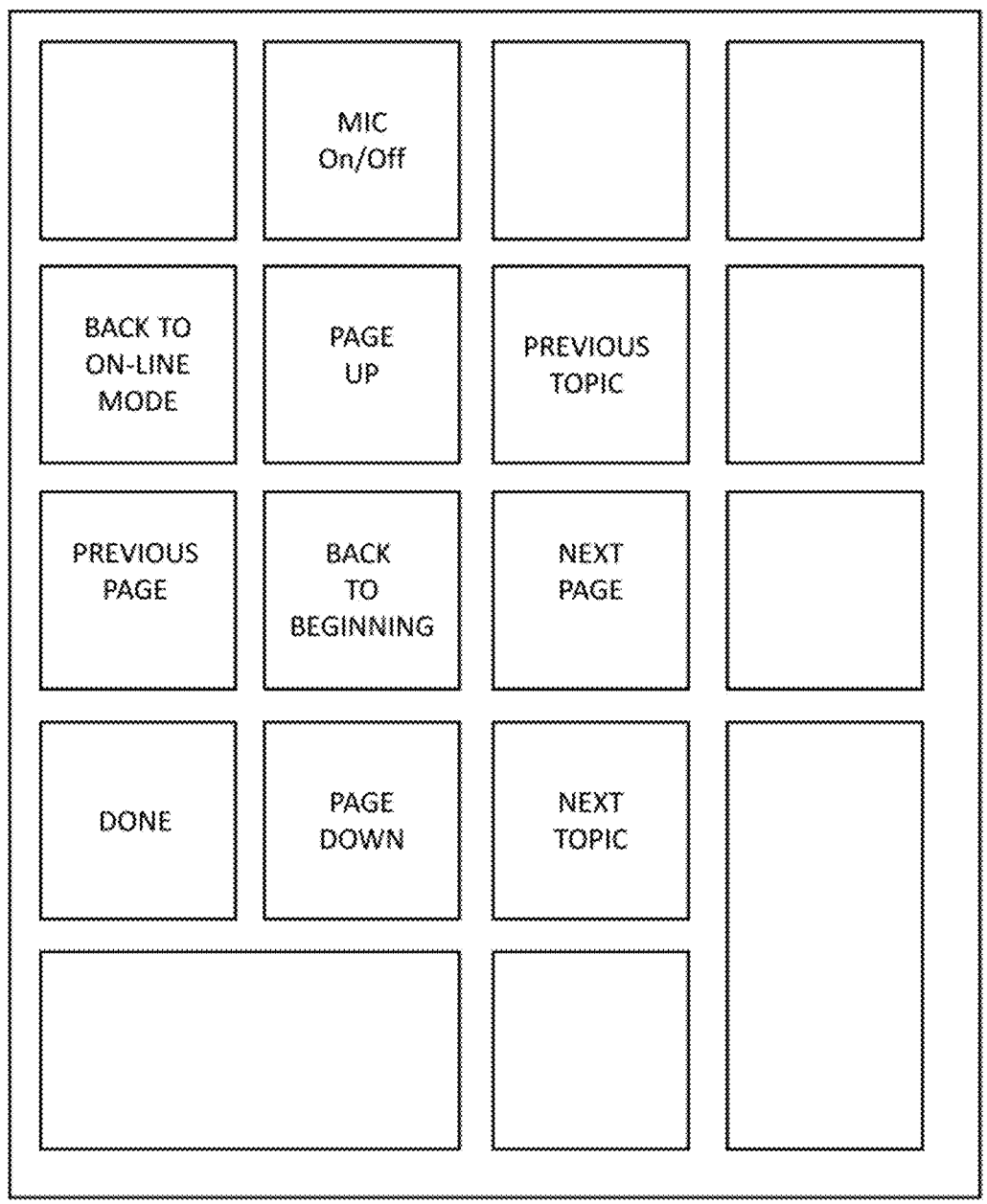
FIG. 22 shows a hot key configuration for a keypad utilized in the vision assistive system of FIG. 16.

FIG. 22 shows a hot key configuration for a keypad utilized in the vision assistive system of FIG. 16. As illustrated in FIG. 22, the hot key configuration shows all the functions that can be performed with the keys on the keypad for when in Help mode.

The physical "Left" and "Right" arrows move through the pages, and the physical "5" key is a shortcut to move back to the beginning of the help pages. The physical "Up" and "Down" arrows move up and down the page.

Pages are organized as topics. The physical "PdUp" and "PgDn" keys move to previous topic and next topic, respectively. Moving between topics is a quick way to skip over pages to get to the next topic of interest.

It is noted that voice commands can be used in lieu of the keypad commands. The following Table provides an example of the voice commands that can be utilized.

TABLE

| | | Voice Commands | |
| --- | --- | --- | --- |
| | Command Description | Voice Input | Voice Response (after command completed) |
| | Live Video Mode | | |
| magnify | zoom in | zoom in | zoomed in (when cannot zoom in anymore, respond with "already at highest zoom level") |
| | zoom out | zoom out | zoomed out (when cannot zoom out anymore, respond with "already at lowest zoom level") |
| color mode selection | next color | next color | color set to ?? |
| | previous color | previous color | color set to ?? |
| | color | color | color set to ?? |
| | Blue on Yellow | Blue on Yellow | color set to ?? |
| | Yellow on Blue | Yellow on Blue | color set to ?? |
| | Black on Yellow | Black on Yellow | color set to ?? |

TABLE-continued

|  | Command Description | Voice Commands Voice Input | Voice Response (after command completed) |
| --- | --- | --- | --- |
|  |  | Yellow on Black | color set to ?? |
|  | Yellow on Black |  |  |
|  | White on Red | White on Red | color set to ?? |
|  | Red on White | Red on White | color set to ?? |
|  | White on Blue | White on Blue | color set to ?? |
|  | Blue on White | Blue on White | color set to ?? |
| Brightness adjust | Brightness up (with wrap around) | Brightness up | brightness set to ?? |
|  | Brightness down (with wrap around) | Brightness down | brightness set to ?? |
| LED Illuminator control | LED On | LED On | LED is On |
| LED Illuminator control | LED Off | LED Off | LED is Off |
| Focus control | auto-focus on | auto-focus on | auto-focus is on |
| Focus control | auto-focus off | auto-focus off | auto-focus is off |
| Store Image | Capture Image and go to Off-line mode | Freeze Image | Image captured, now in off-line mode |
| Navigate to Gallery Screen | Navigate to Gallery Screen | Gallery | Showing Gallery |
| Navigate to Help Screen | Navigate to Help Screen | Help | Showing Help Screen |
| Navigate to Settings Screen | Navigate to Settings Screen | Settings | Showing Settings screen |
|  | Off-Line Mode |  |  |
| magnify | zoom in | zoom in | zoomed in (when cannot zoom in anymore, respond with "already at highest zoom level") |
|  | zoom out | zoom out | zoomed out (when cannot zoom out anymore, respond with "already at lowest zoom level") |
| color mode selection | next color | next color | color set to ?? |
|  | previous color | previous color | color set to ?? |
|  | color | color | color set to ?? |
|  | Blue on Yellow | Blue on Yellow | color set to ?? |
|  | Yellow on Blue | Yellow on Blue | color set to ?? |
|  | Black on Yellow | Black on Yellow | color set to ?? |
|  | Yellow on Black | Yellow on Black | color set to ?? |
|  | White on Red | White on Red | color set to ?? |
|  | Red on White | Red on White | color set to ?? |
|  | White on Blue | White on Blue | color set to ?? |
|  | Blue on White | Blue on White | color set to ?? |
| Brightness adjust | Brightness up (with wrap around) | Brightness up | brightness set to ?? |
|  | Brightness down (with wrap around) | Brightness down | brightness set to ?? |
| Image navigation | move image up | up | moved up |
|  | move image down | down | moved down |
|  | move image left | left | moved left |
|  | move image right | right | moved right |
| Rotate | Rotate image 90 degrees clockwise | rotate | image rotated |
| Navigate to Gallery Screen | Navigate to Gallery Screen | Gallery | Showing Gallery |
| Back to live video mode | Navigate back to live video screen | home | Showing live video screen |
| Navigate to Help Screen | Navigate to Help Screen | Help | Showing Help Screen |

TABLE-continued

| | | Voice Commands | |
|---|---|---|---|
| | Command Description | Voice Input | Voice Response (after command completed) |
| | Gallery Mode | | |
| Set thumb nail size | set thumb nail larger | zoom in | thumb nail enlarged |
| | set thumb nail smaller | zoom out | thumb nail reduced |
| Image highlight navigation | Navigate to image above | up | up |
| | Navigate to image below | down | down |
| | Navigate to image to the left | left | left |
| | Navigate to image to the right | right | right |
| Delete image | Delete highlighted image | delete | image deleted |
| | Undo delete highlighted image | undo | deleted image restored |
| Select Image | Select highlighted image for viewing in off-line mode | open | selected image opened in off-line mode |
| Navigate to Help Screen | Navigate to Help Screen | Help | Showing Help Screen |
| Back to live video mode | Navigate back to live video screen | home | Showing live video screen |
| | Settings | | |
| Changing setting values | Select Next settings Item | Down | Next Item selected |
| | Select Previous Settings item | Up | Previous item selected |
| | Select next value for item | Next | Next value selected |
| | Select previous value for item | Previous | Previous value selected |
| Change multiple values | Set current settings as default | Save to default | Settings are saved as defaults |
| Reset defaults | Reset defaults to factory settings | Reset defaults | Do you really want to reset defaults |
| | Confirm reset defaults | Yes | Default values have been reset to factory settings |
| | Cancel reset defaults | No | Default values have not been changed |
| Navigation | Navigate to Help Screen | Help | Changes saved - Showing Help Screen |
| | Navigate back to live video screen | home | Changes saved - Showing live video screen shown |
| Done | Save Changes and return to Live Video screen | Done | Changes saved - showing live video screen |
| Cancel | Cancel changes made and return to Live Video screen | Cancel | Changes cancelled - showing live video screen |
| | Help | | |
| Next Page | Navigate to next help page | next | Moved to next page |
| Previous Page | Navigate back to previous help page | previous | Moved to previous page |
| Back to First Page | Navigate to beginning of help document | back to beginning | Moved back to first page |
| Next Topic | Navigate to next Topic | Next topic | Moved to Next Topic |
| Previous Topic | Navigate to Previous Topic | Previous topic | Moved to previous topic |
| Back to live video mode | Navigate to live video mode screen | home | Showing live video screen |
| Done | Navigate to screen where Help was navigated to originally | Done | Showing ?? screen |

In summary, a visual assistive stand includes a base; a vertical arm; and a horizontal attachment arm for supporting an imaging device; the base having a configured receptacle for attaching the vertical arm; the vertical arm and the configured receptacle having a detachable magnetic attachment.

The horizontal attachment arm may include magnets.

The configured receptacle may include magnets and the vertical arm may be constructed of ferrous material.

The vertical arm may include magnets and the configured receptacle may be constructed of ferrous material.

The vertical arm may include orthogonal channels and the configured receptacle may include orthogonal projections to correspond to the orthogonal channels of the vertical arm.

The vertical arm may include orthogonal projections and the configured receptacle may include orthogonal channels to correspond to the orthogonal projections of the vertical arm.

The horizontal attachment arm may be rotatably attached to the vertical arm.

The horizontal attachment arm may be detachable from the vertical arm.

The horizontal attachment arm may be slidably attached to the vertical arm to enable vertical positioning of the horizontal attachment arm.

The vertical arm may include a channel to enable vertical positioning of the horizontal attachment arm.

The configured receptacle may be a member orthogonally projecting from the base and having a pre-determined height.

The base may be shaped to prevent toppling when an imaging device is attached to the horizontal attachment arm.

The base may be weighted to prevent toppling when an imaging device is attached to the horizontal attachment arm.

The base may include magnets to magnetically attach the vertical arm and the horizontal attachment arm to the base when the visual assistive stand is disassembled.

The configured receptacle may include magnets to magnetically attach the vertical arm and the horizontal attachment arm to the configured receptacle when the visual assistive stand is disassembled.

The visual assistive stand may include a horizontal attachment arm locking mechanism to attach the horizontal attachment arm to the vertical arm; the horizontal attachment arm locking mechanism allowing rotation of the horizontal attachment arm; the horizontal attachment arm locking mechanism allowing vertical positioning of the horizontal attachment arm.

The horizontal attachment arm locking mechanism may include a thumb wheel.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A visual assistive stand, comprising:
    a base having a top surface;
    a vertical arm having a height dimension, a length dimension, and a width dimension;
    a horizontal attachment arm for supporting an imaging device;
    a receptacle member, located on said top surface of said base, configured to attach said vertical arm in a first vertical arm position with respect to said base, said height dimension of said vertical arm being orthogonal to said base when said vertical arm is in said first vertical arm position; and
    a magnet;
    said receptacle member having a first vertical surface, a second vertical surface, and a third vertical surface;
    said first vertical surface, said second vertical surface, and said third vertical surface being orthogonal to said base;
    said vertical arm having a first vertical arm surface, a second vertical arm surface, a third vertical arm surface, and a fourth vertical arm surface;
    said first vertical arm surface being configured to engage said first vertical surface when said vertical arm is in said first vertical arm position;
    said second vertical arm surface being configured to engage said second vertical surface when said vertical arm is in said first vertical arm position;
    said third vertical arm surface being configured to engage said third vertical surface when said vertical arm is in said first vertical arm position;
    said top surface of said base forming a receptacle member bottom surface for said receptacle member;
    said fourth vertical arm surface being configured to engage said receptacle member bottom surface when said vertical arm is in said first vertical arm position;
    said magnet being configured to provide a detachable magnetic attachment between said vertical arm and said receptacle member when said vertical arm is in said first vertical arm position;
    said horizontal attachment arm being configured to be rotatably attached to said vertical arm;
    said horizontal attachment arm including a horizontal attachment arm magnet;
    said horizontal attachment arm magnet being configured to provide detachable magnetic attachment between said horizontal attachment arm and said receptacle member when said vertical arm is in a second vertical arm position, said height dimension of said vertical arm being parallel to said base when said vertical arm is in said second vertical arm position.

2. The visual assistive stand, as claimed in claim 1, wherein said magnet is located in said receptacle member and said vertical arm is constructed of ferrous material.

3. The visual assistive stand, as claimed in claim 1, wherein said magnet is located in said vertical arm and said receptacle member is constructed of ferrous material.

4. The visual assistive stand, as claimed in claim 1, wherein said horizontal attachment arm is slidably attached to said vertical arm to enable vertical positioning of said horizontal attachment arm.

5. The visual assistive stand, as claimed in claim 1, wherein said vertical arm includes a slot to enable vertical positioning of said horizontal attachment arm.

6. The visual assistive stand, as claimed in claim 1, wherein said base is shaped to prevent toppling when an imaging device is attached to said horizontal attachment arm.

7. The visual assistive stand, as claimed in claim 1, wherein said base is weighted to prevent toppling when an imaging device is attached to said horizontal attachment arm.

8. The visual assistive stand, as claimed in claim 1, further comprising:
a base magnet, located in said base, configured to magnetically attach said vertical arm to said base when said vertical arm is in a third vertical arm position, said height dimension of said vertical arm being parallel to said base when said vertical arm is in said third vertical arm position.

9. The visual assistive stand, as claimed in claim 1, further comprising:
a receptacle magnet, located in said receptacle member, configured to magnetically attach said vertical arm to said configured receptacle member when said vertical arm is in a third vertical arm position, said height dimension of said vertical arm being parallel to said base when said vertical arm is in said third vertical arm position.

10. The visual assistive stand, as claimed in claim 1, further comprising:
a horizontal attachment arm locking mechanism to attach said horizontal attachment arm to said vertical arm;
said horizontal attachment arm locking mechanism allowing rotation of said horizontal attachment arm;
said horizontal attachment arm locking mechanism allowing vertical positioning of said horizontal attachment arm.

11. The visual assistive stand, as claimed in claim 10, wherein said horizontal attachment arm locking mechanism includes a thumb wheel.

12. A visual assistive stand, comprising:
a base having a top surface;
a vertical arm having a height dimension, a length dimension, and a width dimension;
a horizontal attachment arm for supporting an imaging device; and
a receptacle member, located on said top surface of said base, configured for attaching said vertical arm in a first vertical arm position with respect to said base, said height dimension of said vertical arm being orthogonal to said base when said vertical arm is in said first vertical arm position;
said base including an embedded magnet;
said receptacle member having a first vertical surface, a second vertical surface, and a third vertical surface;
said first vertical surface, said second vertical surface, and said third vertical surface being orthogonal to said base;
said vertical arm having a first vertical arm surface, a second vertical arm surface, a third vertical arm surface, and a fourth vertical arm surface;
said first vertical arm surface being configured to engage said first vertical surface when said vertical arm is in said first vertical arm position;
said second vertical arm surface being configured to engage said second vertical surface when said vertical arm is in said first vertical arm position;
said third vertical arm surface being configured to engage said third vertical surface when said vertical arm is in said first vertical arm position;
said top surface of said base forming a receptacle member bottom surface for said receptacle member;
said fourth vertical arm surface being configured to engage receptacle member bottom surface when said vertical arm is in said first vertical arm position;
said embedded magnet being configured to form a detachable magnetic attachment between said vertical arm and said base when said vertical arm is in said first vertical arm position;
said horizontal attachment arm being configured to be rotatably attached to said vertical arm;
said horizontal attachment arm including a horizontal attachment arm magnet;
said horizontal attachment arm magnet being configured to form a detachable magnetic attachment between said horizontal attachment arm and said receptacle member when said vertical arm is in a second vertical arm position, said height dimension of said vertical arm being parallel to said base when said vertical arm is in said second vertical arm position.

13. The visual assistive stand, as claimed in claim 12, further comprising:
a horizontal attachment arm locking mechanism to attach said horizontal attachment arm to said vertical arm;
said horizontal attachment arm locking mechanism allowing rotation of said horizontal attachment arm;
said horizontal attachment arm locking mechanism allowing vertical positioning of said horizontal attachment arm.

14. A visual assistive stand, comprising:
a base having a top surface;
a vertical arm having a height dimension, a length dimension, and a width dimension;
a horizontal attachment arm for supporting an imaging device; and
a receptacle member, located on said top surface of said base, configured for attaching said vertical arm in a first vertical arm position with respect to said base, said height dimension of said vertical arm being orthogonal to said base when said vertical arm is in said first vertical arm position;
said vertical arm including an embedded magnet;
said receptacle member having a first vertical surface, a second vertical surface, and a third vertical surface;
said first vertical surface, said second vertical surface, and said third vertical surface being orthogonal to said base;
said vertical arm having a first vertical arm surface, a second vertical arm surface, a third vertical arm surface, and a fourth vertical arm surface;
said first vertical arm surface being configured to engage said first vertical surface when said vertical arm is in said first vertical arm position;
said second vertical arm surface being configured to engage said second vertical surface when said vertical arm is in said first vertical arm position;
said third vertical arm surface being configured to engage said third vertical surface when said vertical arm is in said first vertical arm position;
said top surface of said base forming a receptacle member bottom surface for said receptacle member;
said fourth vertical arm surface being configured to engage said configured receptacle member bottom surface when said vertical arm is in said first vertical arm position;
said embedded magnet being configured to form a detachable magnetic attachment between said vertical arm and said base when said vertical arm is in said first vertical arm position;
said horizontal attachment arm being configured to be rotatably attached to said vertical arm;
said horizontal attachment arm including a horizontal attachment arm magnet;
said horizontal attachment arm magnet being configured to form a detachable magnetic attachment between said horizontal attachment arm and said receptacle member when said vertical arm is in a second vertical arm position, said height dimension of said vertical arm being parallel to said base when said vertical arm is in said second vertical arm position.

15. The visual assistive stand, as claimed in claim 14, further comprising:
 a horizontal attachment arm locking mechanism to attach said horizontal attachment arm to said vertical arm;
 said horizontal attachment arm locking mechanism allowing rotation of said horizontal attachment arm;
 said horizontal attachment arm locking mechanism allowing vertical positioning of said horizontal attachment arm.

\* \* \* \* \*